United States Patent
Jin et al.

(10) Patent No.: US 12,279,145 B2
(45) Date of Patent: *Apr. 15, 2025

(54) METHOD AND APPARATUS FOR PERFORMING DYNAMIC CROSS-LINK INTERFERENCE MEASUREMENT AND REPORTING IN NEXT-GENERATION MOBILE COMMUNICATION SYSTEM

(71) Applicant: Samsung Electronics Co., Ltd., Suwon-si (KR)

(72) Inventors: Seungri Jin, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/486,657

(22) Filed: Oct. 13, 2023

(65) Prior Publication Data

US 2024/0049034 A1 Feb. 8, 2024

Related U.S. Application Data

(63) Continuation of application No. 17/088,948, filed on Nov. 4, 2020, now Pat. No. 11,792,670.

(30) Foreign Application Priority Data

Nov. 8, 2019 (KR) .................. 10-2019-0142498
Nov. 21, 2019 (KR) .................. 10-2019-0150303

(51) Int. Cl.
*H04L 27/26* (2006.01)
*H04B 1/10* (2006.01)
(Continued)

(52) U.S. Cl.
CPC .......... *H04W 24/10* (2013.01); *H04B 1/1027* (2013.01); *H04B 17/318* (2015.01);
(Continued)

(58) Field of Classification Search
CPC .. H04L 27/2691; H04W 36/20; H04W 52/24; H04W 40/16; H04B 7/0619;
(Continued)

(56) References Cited

U.S. PATENT DOCUMENTS 11,792,670 B2 * 10/2023 Jin ...................... H04L 25/0226
370/329
2018/0205427 A1 7/2018 Ghosh et al.
(Continued)

FOREIGN PATENT DOCUMENTS

CN 109088683 A 12/2018
CN 110383722 A 10/2019
(Continued)

OTHER PUBLICATIONS

R1-1900489, "U E-to-U E CLI measurement and reporting", Jan. 21-Jan. 25, 2019, pp. 1-5 (Year: 2019).*
(Continued)

*Primary Examiner* — Salvador E Rivas
(74) *Attorney, Agent, or Firm* — Jefferson IP Law, LLP

(57) ABSTRACT

The disclosure relates to a communication method and system for converging a 5th-Generation (5G) communication system for supporting higher data rates beyond a 4th-Generation (4G) system with a technology for Internet of Things (IoT). The disclosure may be applied to intelligent services based on the 5G communication technology and the IoT-related technology, such as smart home, smart building, smart city, smart car, connected car, health care, digital education, smart retail, security and safety services. The disclosure provides a method for performing dynamic cross-
(Continued)

link interference (CLI) measurement and reporting in a mobile communication system. In accordance with an aspect of the disclosure, the method performed by a terminal comprises: receiving, from a base station, first information for a measurement object associated with a CLI and second information for a report configuration, the first information including at least one of configuration for sounding reference signal (SRS) resources and configuration for resources to measure a received signal strength indicator (RSSI) associated with the CLI; obtaining a reference signal received power (RSRP) of at least one SRS based on the SRS resources and at least one bandwidth part (BWP) identifier (ID) included in the configuration for the SRS resources; and transmitting, to the base station, a measurement report including the RSRP based on the second information.

20 Claims, 12 Drawing Sheets

(51) Int. Cl.

| | | |
|---|---|---|
| H04B 17/318 | (2015.01) | |
| H04B 17/336 | (2015.01) | |
| H04B 17/382 | (2015.01) | |
| H04J 11/00 | (2006.01) | |
| H04L 5/00 | (2006.01) | |
| H04L 25/02 | (2006.01) | |
| H04W 24/10 | (2009.01) | |
| H04W 52/24 | (2009.01) | |
| H04B 1/711 | (2011.01) | |
| H04B 7/06 | (2006.01) | |

(52) U.S. Cl.
CPC ......... *H04B 17/328* (2023.05); *H04B 17/336* (2015.01); *H04B 17/382* (2015.01); *H04J 11/0023* (2013.01); *H04J 11/0079* (2013.01); *H04L 5/0051* (2013.01); *H04L 5/0092* (2013.01); *H04L 25/0226* (2013.01); *H04L 27/261* (2013.01); *H04L 27/2613* (2013.01); *H04L 27/2691* (2013.01); *H04W 52/24* (2013.01); *H04B 1/711* (2013.01); *H04B 7/0619* (2013.01); *H04B 7/0636* (2013.01)

(58) Field of Classification Search
CPC .. H04B 7/0636; H04B 17/382; H04B 17/101; H04B 17/201
See application file for complete search history.

(56) References Cited

U.S. PATENT DOCUMENTS

| | | | |
|---|---|---|---|
| 2018/0213427 A1 | 7/2018 | Uemura et al. | |
| 2018/0220318 A1 | 8/2018 | Uemura et al. | |
| 2018/0323916 A1 | 11/2018 | Yang et al. | |
| 2018/0323928 A1 | 11/2018 | Yang | |
| 2019/0274155 A1 | 9/2019 | Bhattad et al. | |
| 2020/0084790 A1 | 3/2020 | Wang et al. | |
| 2020/0092055 A1 | 3/2020 | Choi et al. | |
| 2020/0169435 A1 | 5/2020 | Kang et al. | |
| 2020/0177291 A1 | 6/2020 | Fei et al. | |
| 2020/0213052 A1* | 7/2020 | Li | H04W 72/23 |
| 2020/0228213 A1 | 7/2020 | Masal et al. | |
| 2020/0351690 A1* | 11/2020 | Zhu | H04L 5/0094 |
| 2020/0389805 A1 | 12/2020 | Kim et al. | |
| 2020/0396760 A1 | 12/2020 | Yi et al. | |
| 2021/0006438 A1 | 1/2021 | Harrebek et al. | |
| 2021/0006997 A1 | 1/2021 | Jin et al. | |
| 2021/0135770 A1 | 5/2021 | Schober et al. | |
| 2021/0136696 A1 | 5/2021 | Burke et al. | |
| 2021/0360463 A1 | 11/2021 | Shi et al. | |
| 2021/0368371 A1 | 11/2021 | Wang et al. | |
| 2021/0392530 A1* | 12/2021 | Shi | H04W 72/23 |
| 2021/0409986 A1 | 12/2021 | Wang et al. | |
| 2022/0046716 A1 | 2/2022 | Chai et al. | |
| 2022/0060265 A1 | 2/2022 | Xu et al. | |
| 2022/0159596 A1* | 5/2022 | Kim | H04J 11/00 |
| 2022/0263641 A1* | 8/2022 | Xie | H04L 5/0091 |

FOREIGN PATENT DOCUMENTS

| | | |
|---|---|---|
| TW | 201906372 A | 2/2019 |
| WO | 2017/014111 A1 | 1/2017 |
| WO | 2017/014229 A1 | 1/2017 |
| WO | 2018/228583 A1 | 12/2018 |
| WO | 2019/032031 A1 | 2/2019 |

OTHER PUBLICATIONS

R1-1900489, "U E-to-U E CLI measurement and reporting", Jan. 21-25, 2019, pp. 1-5 (Year: 2019).*
R1-1801798, "U E-to-U E measurement for cross-link interference mitigation", Feb. 26-Mar. 2, 2018, pp. 1-13 (Year: 2018).*
International Search Report dated Feb. 10, 2021, issued in an International Application No. PCT/KR2020/015337.
LGE, 'draft CR on CLI for 38.331', R2-1914012, 3GPP TSG-RAN2 Meeting #107b, Oct. 18, 2019, Chongqing, China, sections 5.5-6.3.2.
ZTE Corporation et al., 'Remaining issues on CLI measurement', R2-1912775, 3GPP TSG-RAN2 Meeting #107b, Oct. 3, 2019, Chongqing, China, sections 2-3.
Huawei et al., 'Introduction of cross link interference management', R2-1913714, 3GPP TSG-RAN2 Meeting #107b, Oct. 4, 2019, Chongqing, China, section X.2.
Qualcomm Incorporated: "CLI-RSSI and SRS-RSRP Measurement", 3GPP Draft; R2-1906109, 3rd Generation Partnership Project (3GPP), Mobile Competence Centre ; 650, Route Des Lucioles; F-06921 Sophia-Antipolis Cedex ; France vol. RAN WG2, No. Reno, Nevada USA; May 13, 2019-May 17, 2019 May 13, 2019 (May 13, 2019), XP051729586.
Samsung: "Additional frequency information for CLI measurements", 3GPP Draft; R2-2002885, 3rd Generation Partnership Project (3GPP), Mobile Competence Centre ; 650, Route Des Lucioles ; F-06921 Sophia-Antipolis Cedex ; France vol. RAN WG2, No. Online Meeting ;Apr. 20, 2020-Apr. 30, 2020 Apr. 10, 2020 (Apr. 10, 2020), XP051871 064.
Indian Office Action dated Sep. 7, 2022, issued in Indian Application No. 202217023483.
European Search Report dated Oct. 4, 2022, issued in European Application No. 20884302.9.
R2-2002885, "Additional frequency information for CLI measurements", Apr. 20-30, 2020, pp. 1-5 (Year: 2020).
Nokia et al.; UE CLI measurement configuration and reporting; 3GPP TSG-RAN2#106; R2-1906637; Reno, USA; May 13-17, 2019; May 3, 2019.
Nokia et al.; UE CLI measurement configuration, reporting, and NW signaling; 3GPP TSG-RAN2#107bis; R2-1912408; Chongqing, China; Oct. 14-18, 2019; Oct. 7, 2019.
Chinese Office Action with English translation dated May 20, 2024; Chinese Appln. No. 202080077735.8.
European Search Report dated Aug. 7, 2024; European Appln. No. 20 884 302.9-1215.
Chinese Office Action with English translation dated Dec. 26, 2024; Chinese Appln. No. 202080077735.8.

* cited by examiner

FIG. 7

Option 1 : Bitmap-type SRS resource update

| R | Serving Cell ID | BWP ID | | | | | |
|---|---|---|---|---|---|---|---|
| $S_0$ | $S_1$ | $S_2$ | $S_3$ | $S_4$ | $S_5$ | $S_6$ | $S_7$ |
| $S_8$ | $S_9$ | $S_{10}$ | $S_{11}$ | $S_{12}$ | $S_{13}$ | $S_{14}$ | $S_{15}$ |
| $S_{16}$ | $S_{17}$ | $S_{18}$ | $S_{19}$ | $S_{20}$ | $S_{21}$ | $S_{22}$ | $S_{23}$ |
| $S_{24}$ | $S_{25}$ | $S_{26}$ | $S_{27}$ | $S_{28}$ | $S_{29}$ | $S_{30}$ | $S_{31}$ |

Option 2 : Explicit ID-based SRS resource update

| R | SRS Resource's Cell ID | SRS Resource BWP ID |
|---|---|---|
| A/D | SRS Resource $ID_0$ | |

...

| R | SRS Resource's Cell ID | SRS Resource BWP ID |
|---|---|---|
| A/D | SRS Resource $ID_0$ | |

METHOD AND APPARATUS FOR PERFORMING DYNAMIC CROSS-LINK INTERFERENCE MEASUREMENT AND REPORTING IN NEXT-GENERATION MOBILE COMMUNICATION SYSTEM

CROSS-REFERENCE TO RELATED APPLICATION(S)

This application is a continuation application of prior application Ser. No. 17/088,948 filed on Nov. 4, 2020, which has issued as U.S. Pat. No. 11,792,670 on Oct. 17, 2023; which is based on and claims priority under 35 U.S.C. 119(a) of a Korean patent application number 10-2019-0142498, filed on Nov. 8, 2019, in the Korean Intellectual Property Office, and of a Korean patent application number 10-2019-0150303, filed on Nov. 21, 2019, in the Korean Intellectual Property Office, the disclosure of each of which is incorporated by reference herein in its entirety.

BACKGROUND

1. Field

The disclosure relates to a method and apparatus for performing dynamic cross-link interference measurement and reporting in a mobile communication system.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mm-Wave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid Frequency Shift Keying (FSK) and Quadrature Amplitude Modulation (QAM) (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Recently, reference signal measurement and reporting in a 5G communication system have been performed only based on a downlink reference signal transmitted by a base station, and a procedure of measuring and reporting, by a terminal, a signal transmitted from another terminal has not been defined. Therefore, a new procedure and function are required.

The above information is presented as background information only to assist with an understanding of the disclosure. No determination has been made, and no assertion is made, as to whether any of the above might be applicable as prior art with regard to the disclosure.

SUMMARY

The disclosure pertains to receiving a report on cross-link interference information from a terminal and utilizing the report in order to dynamically operate a time-division-duplexed (TDD) resource in a serving cell in which TDD is configured. To this end, a series of operations of measuring and reporting, by a terminal, uplink interference information transmitted from another terminal in a neighbor cell (or a cross-link) is to be defined. The interference information may be sounding reference signal—reference signal received power (SRS-RSRP) and a cross-link interference—received signal strength indicator (CLI-RSSI).

Further, reference signal measurement and reporting in the existing new radio (NR) system have been performed based on a downlink reference signal that is transmitted by a base station. However, a procedure of measuring and reporting, by a terminal, a signal transmitted from another terminal has not been defined, and thus a new procedure and function are required.

Especially, in the disclosure, in order to solve a problem of incapability to perform accurate measurement, which may be caused by omission of bandwidth part (BWP)-related information or frequency information in an SRS resource configuration operation for sounding reference signal—reference signal received power (SRS-RSRP) measurement, addition of the BWP-related information or the frequency information is proposed. In addition, the disclosure may allow dynamic turning on-off of measurement of a configured SRS resource, thereby reducing operation time delay.

In a next-generation mobile communication system according to various embodiments of the disclosure, a series of procedures for measuring an uplink signal, for example, SRS-RSRP and CLI-RSSI, transmitted from another terminal, and reporting a measured value to a base station may be defined. Accordingly, the base station receiving the measured value may configure dynamic TDD based on the measured value. In other words, when interference from neighbor cells is strong, TDD uplink allocation to a terminal may be limited, and accordingly, data quality can be enhanced.

Further, in various embodiments of the disclosure, BWP-related information or frequency information may be added to SRS measurement resource configuration information in an SRS resource configuration operation for SRS-RSRP measurement, whereby more accurate measurement can be performed in consideration of the BWP-related information or the frequency information. In addition, the disclosure may allow dynamic turning on/off measurement of a configured SRS resource, thereby reducing operation time delay.

Aspects of the disclosure are to address at least the above-mentioned problems and/or disadvantages and to provide at least the advantages described below. Accordingly, an aspect of the disclosure is to provide an apparatus and method for performing dynamic cross-link interference measurement and reporting.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes receiving, from a base station, first information for a measurement object associated with a cross link interference (CLI) and second information for a report configuration, the first information including at least one of configuration for sounding reference signal (SRS) resources and configuration for resources to measure a received signal strength indicator (RSSI) associated with the CLI, obtaining a reference signal received power (RSRP) of at least one SRS based on the SRS resources and at least one bandwidth part (BWP) identifier (ID) included in the configuration for the SRS resources, and transmitting, to the base station, a measurement report including the RSRP based on the second information.

In an embodiment of the disclosure, wherein the at least one SRS is identified based on the SRS resources, the at least one BWP ID, and information on a serving cell included in the configuration for the SRS resources, the serving cell being associated with the at least one BWP ID.

In an embodiment of the disclosure, wherein transmitting the measurement report comprises in case that a RSRP threshold is included in the second information and is lower than the RSRP, transmitting, to the base station, the measurement report including the RSRP.

In an embodiment of the disclosure, the method further comprises obtaining the RSSI associated with the CLI based on the configuration for the resources, and in case that a RSSI threshold is included in the second information and is lower than the RSSI, transmitting, to the base station, a measurement report including the RSSI.

In accordance with another aspect of the disclosure, a method performed by a base station is provided. The method includes transmitting, to a terminal, first information for a measurement object associated with a cross link interference (CLI) and second information for a report configuration, the first information including at least one of configuration for sounding reference signal (SRS) resources and configuration for resources to measure a received signal strength indicator (RSSI) associated with the CLI, and receiving, from the terminal, a measurement report including a reference signal received power (RSRP) of at least one sounding reference signal (SRS) based on the second information, wherein the RSRP of the at least one SRS is obtained based on the SRS resources, and at least one bandwidth part (BWP) identifier (ID) included in the configuration for the SRS resources.

In an embodiment of the disclosure, wherein the at least one SRS is identified based on the SRS resources, the at least one BWP ID, and information on a serving cell included in the configuration for the SRS resources, the serving cell being associated with the at least one BWP ID.

In an embodiment of the disclosure, wherein receiving the measurement report comprises in case that a RSRP threshold is included in the second information and is lower than the RSRP, receiving, from the terminal, the measurement report including the RSRP.

In an embodiment of the disclosure, the method further comprises: in case that a RSSI threshold is included in the second information and is lower than a RSSI, receiving, from the terminal, a measurement report including the RSSI, wherein the RSSI associated with the CLI is obtained based on the configuration for the resources.

In accordance with another aspect of the disclosure, a terminal in a wireless communication system is provided. The terminal includes a transceiver, and a controller coupled with the transceiver and configured to receive, from a base station, first information for a measurement object associated with a cross link interference (CLI) and second information for a report configuration, the first information including at least one of configuration for sounding reference signal (SRS) resources and configuration for resources to measure a received signal strength indicator (RSSI) associated with the CLI, obtain a reference signal received power (RSRP) of at least one SRS based on the SRS resources, and at least one bandwidth part (BWP) identifier (ID) included in the configuration for the SRS resources, and transmit, to the base station, a measurement report including the RSRP based on the second information.

In an embodiment of the disclosure, wherein the at least one SRS is identified based on the SRS resources, the at least one BWP ID, and information on a serving cell included in the configuration for the SRS resources, the serving cell being associated with the at least one BWP ID.

In an embodiment of the disclosure, wherein the controller is configured to in case that a RSRP threshold is included in the second information and is lower than the RSRP, transmit, to the base station, the measurement report including the RSRP.

In an embodiment of the disclosure, wherein the controller is further configured to obtain the RSSI associated with the CLI based on the configuration for the resources, and in case that a RSSI threshold is included in the second information and is lower than the RSSI, transmit, to the base station, a measurement report including the RSSI.

In accordance with another aspect of the disclosure, a base station in a wireless communication system is provided. The base station includes a transceiver, and a controller coupled with the transceiver and configured to transmit, to a terminal, first information for a measurement object associated with a cross link interference (CLI) and second information for a report configuration, the first information including at least one of configuration for sounding reference signal (SRS) resources and configuration for resources to measure a received signal strength indicator (RSSI) associated with the CLI, and receive, from the terminal, a measurement report including a reference signal received power (RSRP) of at least one sounding reference signal (SRS) based on the second information, wherein the RSRP of the at least one SRS is obtained based on the SRS resources, and at least one bandwidth part (BWP) identifier (ID) included in the configuration for the SRS resources.

In an embodiment of the disclosure, wherein the at least one SRS is identified based on the SRS resources, the at least one BWP ID, and information on a serving cell included in the configuration for the SRS resources, the serving cell being associated with the at least one BWP ID.

In an embodiment of the disclosure, wherein the controller is configured to in case that a RSRP threshold is included in the second information and is lower than the RSRP, receive, from the terminal, the measurement report including the RSRP.

In an embodiment of the disclosure, wherein the controller is further configured to in case that a RSSI threshold is included in the second information and is lower than a RSSI, receive, from the terminal, a measurement report including the RSSI, wherein the RSSI associated with the CLI is obtained based on the configuration for the resources.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 7 illustrates the structure of a medium-access-control—control element (MAC CE) indicating dynamic SRS measurement for cross-link interference according to an embodiment of the disclosure;

The same reference numerals are used to represent the same elements throughout the drawings.

DETAILED DESCRIPTION

Figure 1:
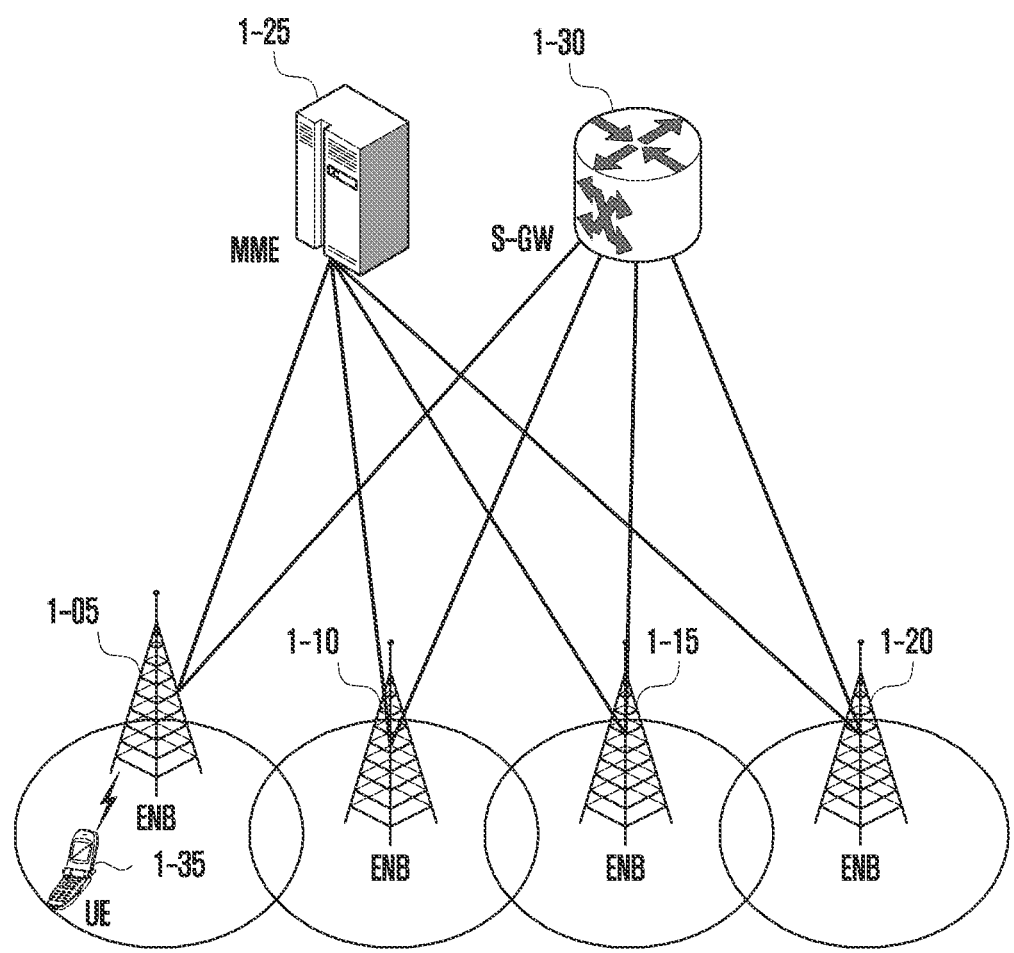
FIG. 1 illustrates a structure of an LTE system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operations to be performed on the computer or other programmable apparatus to produce a computer implemented process such that the instructions that execute on the computer or other programmable apparatus provide operations for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, the disclosure will be described using terms and names defined in the 3rd generation partnership project long term evolution (3GPP LTE) standards for the convenience of description. However, the disclosure is not limited by these terms and names, and may be applied in the same way to systems that conform other standards.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used. For example, in the following description, the term "terminal" may refer to a MAC entity in each terminal that exists for each of a master cell group (MCG) and a secondary cell group (SCG).

In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto.

In particular, the disclosure may be applied to intelligent services (e.g., smart homes, smart buildings, smart cities, smart cars or connected cars, healthcare, digital education, retail business, security and safety-related services, etc.) on the basis of 5G communication technologies and IoT-related technologies. In the disclosure, the term "eNB" may be interchangeably used with the term "gNB". That is, a base station described as "eNB" may indicate "gNB". Further, the term "terminal" may refer to mobile phones, NB-IoT devices, and sensors, and may also refer to other wireless communication devices.

A wireless communication system has been developed from a wireless communication system providing voice-centered service in early stages toward a broadband wireless communication system providing high-speed, high-quality packet data services in accordance with communication standards such as high-speed packet access (HSPA), long-term evolution (LTE or evolved universal terrestrial radio access (E-UTRA)), LTE-advanced (LTE-A), and LTE-Pro of 3GPP, high rate packet data (HRPD) and ultra mobile broadband (UMB) of 3GPP2, IEEE 802.16e, and the like.

As a representative example of the broadband wireless communication system, an LTE system has adopted an orthogonal frequency-division multiplexing (OFDM) scheme in a downlink (DL) and has adopted a single carrier frequency-division multiple-access (SC-FDMA) scheme in an uplink (UL). The uplink is a radio link through which a user equipment ((UE) or a mobile station (MS)) transmits data or a control signal to a base station (eNodeB or base station (BS)), and the downlink is a radio link through which a base station transmits data or a control signal to a terminal. The multiple-access scheme as described above normally allocates and operates time and frequency resources for transmitting data or control information for each user to prevent the time and frequency resources from overlapping, that is, to establish orthogonality, thereby dividing the data or the control information of each user.

A future communication system subsequent to the LTE, that is, a 5G communication system has to be able to freely reflect various requirements from a user, a service provider, and the like, and thus service satisfying all of the various requirements needs to be supported. The services considered for the 5G communication system include enhanced mobile broadband (eMBB), massive machine-type communication (mMTC), ultra-reliable low-latency communication (URLLC), etc.

According to some embodiments, the eMBB aims to provide a data rate superior to the data rate supported by the existing LTE, LTE-A, or LTE-Pro. For example, in the 5G communication system, the eMBB should be able to provide a peak data rate of 20 Gbps in the downlink and a peak data rate of 10 Gbps in the uplink from the viewpoint of one base station. In addition, the 5G communication system should be able to provide not only the peak data rate but also an increased user-perceived terminal data rate. In order to satisfy such requirements, improvement of various transmitting and receiving technologies including a further improved multi-input multi-output (MIMO) transmission technology may be required in the 5G communication system. In addition, a signal is transmitted using a transmission bandwidth of up to 20 MHz in the 2 GHz band used by the current LTE, but the 5G communication system uses a bandwidth wider than 20 MHz in the frequency band of 3 to 6 GHz or 6 GHz or higher, thereby satisfying the data rate required in the 5G communication system.

In addition, the mMTC is being considered to support application services such as the Internet of Things (IoT) in the 5G communication system. The mMTC may be required in order to support access by a large number of terminals in a cell, coverage enhancement of a terminal, improved battery time, and cost reduction of a terminal in order to efficiently provide the IoT. The IoT needs to be able to support a large number of terminals (for example, 1,000,000 terminals/km 2) in a cell because it is attached to various sensors and devices to provide communication functions. Further, a terminal supporting mMTC is more likely to be located in a shaded area that is not covered by a cell due to the nature of services, such as a basement of a building, and thus the terminal requires wider coverage than other services provided in the 5G communication system. The terminal supporting mMTC needs to be configured as an inexpensive terminal and may require a very long battery life time, such as 10 to 15 years, because it is difficult to frequently replace the battery of the terminal.

Finally, the URLLC is a cellular-based wireless communication service used for mission-critical purposes, and may be applied to services used for remote control for a robot or machinery, industrial automation, an unmanned aerial vehicle, remote health care, an emergency alert, or the like. Therefore, the communication provided by the URLLC may provide very low latency (ultra-low latency) and very high reliability (ultra-high reliability). For example, a service that supports the URLLC needs to satisfy air interface latency of less than 0.5 milliseconds, and may also have requirements of a packet error rate of 10-5% or lower.

Therefore, for the service that supports the URLLC, the 5G system needs to provide a transmission time interval (TTI) smaller than those of other services, and design matters for allocating wide resources in the frequency band in order to secure reliability of the communication link may also arise.

The above-described three services considered in the 5G communication system, that is, the eMBB, the URLLC, and the mMTC, may be multiplexed and transmitted in a single system. Here, in order to satisfy the different requirements of each of the services, different transmission or reception schemes and different transmission and reception parameters may be used for the services. However, the above-described mMTC, URLLC, and eMBB are merely examples of different types of services, and the types of services which are to be applied according to the disclosure are not limited to the above-described examples.

In addition, hereinafter, embodiments of the disclosure will be described by taking an LTE, LTE-A, LTE-Pro, or 5G (or NR, that is, new-generation mobile communication) system as an example, but embodiments of the disclosure may be applied to other communication systems having a similar technical background or channel form. In addition, embodiments of the disclosure may be applied to other communication systems by those skilled in the art through some modifications without greatly departing from the scope of the disclosure.

The methods according to claims of the disclosure or embodiments of the description may be implemented in the form of hardware, software, or a combination of hardware and software.

When the methods are implemented as software, a computer-readable storage medium for storing one or more programs (software modules) may be provided. The one or more programs stored in the computer-readable storage medium are configured to be executed by one or more processors in an electronic device. The one or more programs include instructions which cause the electronic device to execute the methods according to claims of the disclosure or embodiments of the description.

Such a program (software module or software) may be stored in non-volatile memory including random access memory and flash memory, read-only memory (ROM), electrically erasable programmable read-only memory (EEPROM), a magnetic disc storage device, a compact disc-ROM (CD-ROM), digital versatile discs (DVDs), other types of optical storage device, or a magnetic cassette. Alternatively, the program may be stored in the memory that is configured of combinations of some or all of the above-described memories. Further, a plurality of such memories may be included.

Further, the program may be stored in an attachable storage capable of being accessed through a communication network such as the Internet, an intranet, a local area network (LAN), a wide LAN (WLAN), or a storage area network (SAN), or a communication network configured as a combination thereof. Such a storage device may access an electronic device, which performs an embodiment of the disclosure, via an external port. Furthermore, an additional storage device on the communication network may have access to an electronic device which performs an embodiment of the disclosure.

In the above-described embodiments of the disclosure, an element or elements included in the disclosure are expressed in a singular or plural form depending on the described embodiment. However, the singular or plural form is selected appropriately for the situation that is assumed for convenience of description, and the disclosure is not limited to the singular or plural form. An element expressed in a singular form may include a plurality of elements, and elements expressed in a plural form may include a single element.

Although particular embodiments are described in the detailed description of the disclosure, it will be apparent that various modifications and changes may be made without departing from the scope of the disclosure. Therefore, the scope of the disclosure should not be construed as being limited to the above-described embodiments, but should be understood to be defined by the appended claims and equivalents thereto.

Hereinafter, an embodiment of the disclosure is described with reference to the accompanying drawings in detail. The detailed description of a well-known function or configuration incorporated herein may be omitted when it is determined that such detailed description may obscure the subject matter of the disclosure. Further, the following terms are defined in consideration of functionality in the disclosure, and may vary according to the intention of a user or an operator, usage, etc. Therefore, the definition should be made on the basis of the overall content of the specification.

Advantages and features of the disclosure and methods of accomplishing the same may be understood more easily with reference to the following detailed description of an embodiment and the accompanying drawings. The disclosure is not limited to the following embodiments, may be implemented in many different forms. These embodiments are provided so that the disclosure will be thorough and complete and will fully convey the scope of the disclosure to those skilled in the art, and the disclosure is to be defined only by the appended claims. Like reference numerals refer to like elements throughout the specification.

Hereinafter, the principle of operation of the disclosure is described with reference to the accompanying drawings in detail. A detailed description of well-known functions or configurations incorporated herein may be omitted when it is determined that such detailed description may obscure the subject matter of the disclosure. Further, the following terms are defined in consideration of functionality in the disclosure, and may vary according to the intention of a user or an operator, usage, etc. Therefore, the definitions should be understood on the basis of the overall content of the specification. Hereinafter, terms identifying an access node, terms indicating a network entity, terms indicating messages, terms indicating an interface between network entities, terms indicating various types of identification information, and the like, which are used in the following description, are used as an example for convenience of description. Accordingly, the disclosure is not limited to the terms used below, and other terms indicating objects having the equivalent technical meaning may be used.

For convenience of description, the disclosure uses terms and names defined in, or modified based on, the $3^{rd}$-Generation Partnership Project (3GPP) long-term evolution (LTE) standards. However, the disclosure is not limited to these terms and names, and may be equally applied to systems according to other standards. That is, the system to which the disclosure is applied may be the entire mobile communication system, especially, an entire LTE system or NR system.

FIG. 1 illustrates the structure of an LTE system according to an embodiment of the disclosure.

Referring to FIG. 1, a radio access network (RAN) of the LTE system includes evolved base stations (hereinafter, referred to as "evolved node Bs (eNBs)", "Node Bs", or "base stations") 1-05, 1-10, 1-15, and 1-20, a mobility management entity (MME) 1-25, and a serving-gateway (S-GW) 1-30. A user equipment (hereinafter, referred to as a "UE" or "terminal") 1-35 accesses an external network via the eNBs 1-05 to 1-20 and the S-GW 1-30.

In FIG. 1, the eNBs 1-05 to 1-20 correspond to the existing node Bs of a universal mobile telecommunication system (UMTS). The eNB is connected to the UE 1-35 via a radio channel, and performs more complex functions than an existing node B. Since all user traffic data including real-time services such as voice over Internet protocol (VoIP) is serviced through a shared channel in the LTE system, a device for collecting state information, such as buffer state information of a UE, available transmission power state information, and channel state information and performing scheduling is required, and each of the eNBs 1-05, 1-10, 1-15, and 1-20 serves as such a device. A single eNB generally controls multiple cells. For example, the LTE system uses a radio-access technology such as orthogonal frequency-division multiplexing (hereinafter, referred to as "OFDM") in a bandwidth of 20 MHz to achieve a data rate of 100 Mbps.

In addition, the LTE system also applies adaptive modulation & coding (AMC) to determine a modulation scheme and a channel-coding rate in accordance with the channel state of a terminal. The 5-GW 1-30 is a device for providing a data bearer, and generates or releases the data bearer under the control of the MME 1-25. The MME is a device for performing a mobility management function and various control functions for a terminal, and is connected to multiple base stations.

Figure 2:
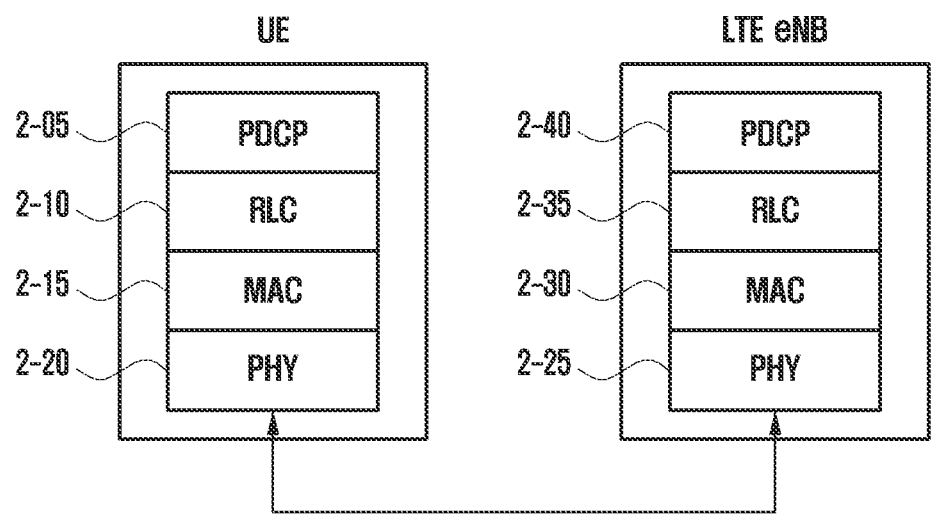
FIG. 2 illustrates a radio protocol structure in an LTE system according to an embodiment of the disclosure.

FIG. 2 illustrates a radio protocol structure in an LTE system according to an embodiment of the disclosure.

Referring to FIG. 2, the radio protocol in the LTE system includes packet data convergence protocols (PDCPs) 2-05 and 2-40, radio link controls (RLCs) 2-10 and 2-35, and medium access controls (MACs) 2-15 and 2-30 in a terminal and an eNB, respectively. The PDCPs 2-05 and 2-40 perform operations of IP header compression/recovery and the like. The main function of the PDCP is summarized below:

Header compression and decompression: robust header compression (ROHC) only
Transfer of user data
In-sequence delivery of upper layer packet data units (PDUs) at PDCP re-establishment procedure for RLC acknowledged mode (AM)
For split bearers in DC (only support for RLC AM): PDCP PDU routing for transmission and PDCP PDU reordering for reception
Duplicate detection of lower layer service data units (SDUs) at PDCP re-establishment procedure for RLC AM
Retransmission of PDCP SDUs at handover and, for split bearers in DC, of PDCP PDUs at PDCP data-recovery procedure, for RLC AM
Ciphering and deciphering
Timer-based SDU discard in uplink.

The radio link controls (hereinafter, referred to as "RLCs") 2-10 and 2-35 reconfigure the PDCP packet data unit (PDU) at an appropriate size to perform an automatic repeat reQuest (ARQ) operation or the like. The main functions of the RLC are summarized below:

Transfer of upper layer PDUs
Error Correction through ARQ (only for AM data transfer)
Concatenation, segmentation and reassembly of RLC SDUs (only for unacknowledged mode (UM) and AM data transfer)
Re-segmentation of RLC data PDUs (only for AM data transfer)
Reordering of RLC data PDUs (only for UM and AM data transfer
Duplicate detection (only for UM and AM data transfer)
Protocol error detection (only for AM data transfer)
RLC SDU discard (only for UM and AM data transfer)
RLC re-establishment.

The MACs 2-15 and 2-30 are connected to several RLC layer devices configured in one terminal, and perform an operation of multiplexing RLC PDUs into a MAC PDU and demultiplexing the RLC PDUs from the MAC PDU. The main functions of the MAC are summarized below:

Mapping between logical channels and transport channels
Multiplexing/demultiplexing of MAC SDUs belonging to one or different logical channels into/from transport blocks (TB) delivered to/from the physical layer on transport channels
Scheduling information reporting
Error correction through HARQ
Priority handling between logical channels of one UE
Priority handling between UEs by means of dynamic scheduling
Multimedia broadcast multicast service (MBMS) service identification
Transport format selection
Padding Physical layers (PHYs) 2-20 and 2-25 generate an OFDM symbol by performing an operation of channel-coding and modulating upper-layer data and transmit the same through a radio channel, or perform an operation of demodulating and channel-decoding the OFDM symbol received through the radio channel and transmit the same to an upper layer.

Figure 3:
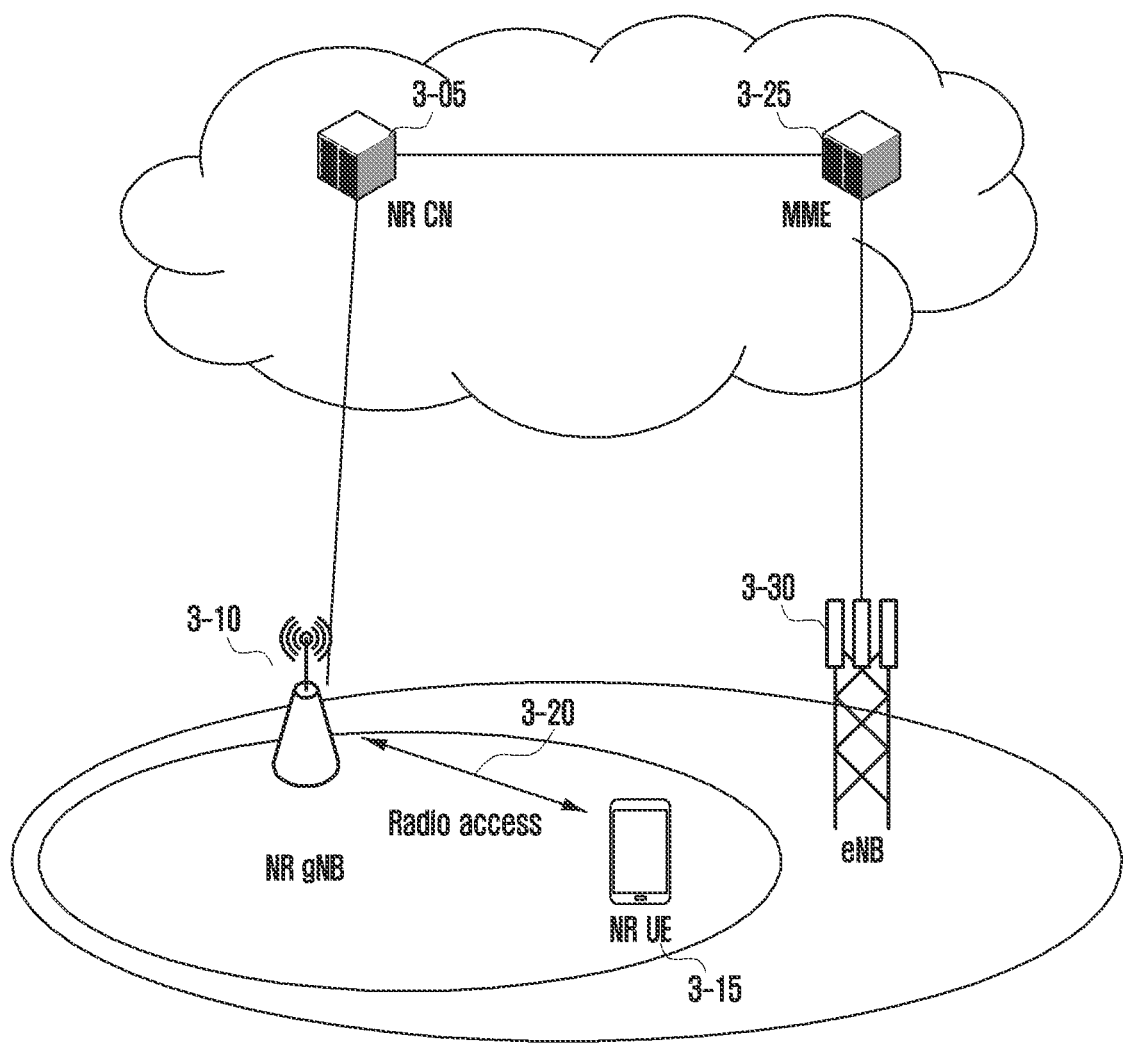
FIG. 3 illustrates the structure of a next-generation mobile communication system according to an embodiment of the disclosure.

FIG. 3 illustrates the structure of a next-generation mobile communication system according to an embodiment of the disclosure.

Referring to FIG. 3, a radio access network in the next-generation mobile communication system includes a new-radio node B (hereinafter, referred to as an "NR NB" or "NR gNB") 3-10 and a new-radio core network (NR CN) 3-05. A new-radio user equipment (hereinafter, referred to as an "NR UE" or a "terminal") 3-15 accesses an external network through the NR gNB 3-10 and the NR CN 3-05.

In FIG. 3, the NR gNB 3-10 corresponds to an evolved node B (eNB) of the existing LTE system. The NR gNB may be connected to the NR UE 3-15 through a radio channel 3-20, and thus may be capable of providing service superior to that of the existing node B. Since all user traffic is serviced through shared channels in the next-generation mobile communication system, a device for collecting state information, such as buffer state information of each UE, available transmission power state information, and channel state information, and performing scheduling is required, and the NR gNB 3-10 serves as such a device. A single NR gNB generally controls multiple cells. In order to implement ultra-high-speed data transmission as compared with the existing LTE, the NR gNB may have a maximum bandwidth that is equal to or higher than the existing maximum bandwidth, and a beamforming technology may be additionally combined using orthogonal frequency-division multiplexing (hereinafter, referred to as "OFDM") as radio connection technology. In addition, an adaptive modulation & coding (AMC) scheme that determines a modulation scheme and a channel-coding rate in accordance with the channel state of the terminal is applied to the NR gNB. The NR CN 3-05 performs mobility support, bearer configuration, quality of service (QoS) configuration, and the like. The NR CN is a device that performs not only terminal mobility management functions but also various types of control functions, and is connected to multiple base stations. Further, the next-generation mobile communication system may be linked with the existing LTE system, and the NR CN is connected to the MME 3-25 through a network interface. The MME is connected to an eNB 3-30, that is, the existing base station.

Figure 4:
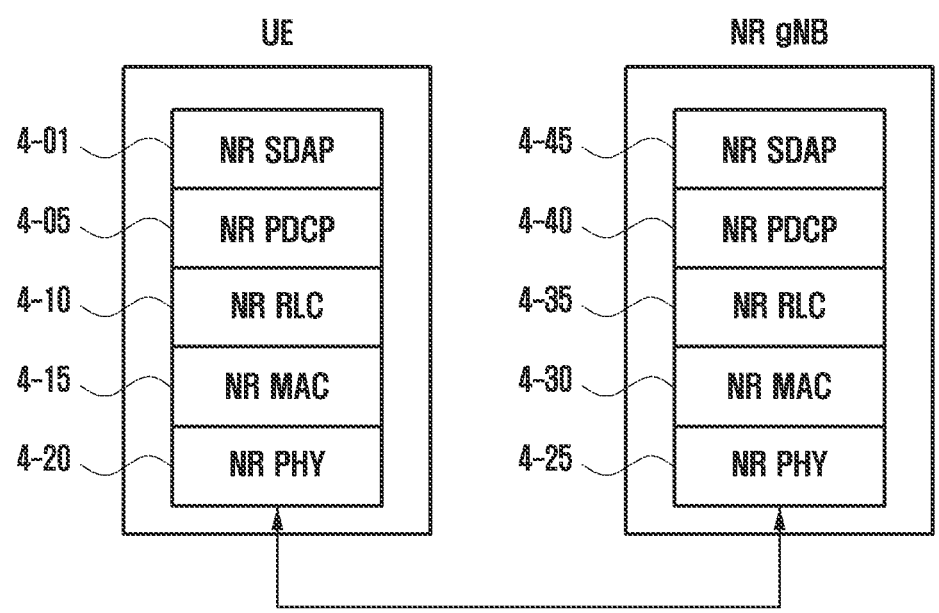
FIG. 4 illustrates a radio protocol structure in the next-generation mobile communication system according to an embodiment of the disclosure.

FIG. 4 illustrates a radio protocol structure in the next-generation mobile communication system according to an embodiment of the disclosure.

Referring to FIG. 4, the radio protocol in the next-generation mobile communication system includes NR service data adaptation protocols (SDAPs) 4-01 and 4-45, NR PDCPs 4-05 and 4-40, NR RLCs 4-10 and 4-35, and NR MACs 4-15 and 4-30, in a terminal and an NR base station, respectively.

The main function of the NR SDAPs 4-01 and 4-45 may include some of the following functions:

Transfer of user plane data
Mapping between a QoS flow and a data radio bearer (DRB) for both DL and UL
Marking QoS flow ID in both DL and UL packets
Reflective QoS flow to DRB mapping for the UL SDAP PDUs.

For an SDAP-layer device, the terminal may receive, through a radio resource control (RRC) message, a configuration as to whether to use a header of the SDAP-layer device or to use a function of the SDAP-layer device function for each PDCP layer device, each bearer, or each logical channel. When an SDAP header is configured, the terminal may be indicated to update or reconfigure, with an NAS reflective QoS 1-bit indicator and an AS reflective QoS 1-bit indicator of the SDAP header, mapping information for uplink and downlink QoS flows and a data bearer. The SDAP header may include QoS flow ID information indicating the QoS. The QoS information may be used to determine data-processing priority, as scheduling information, or similarly in order to ensure a smooth service.

The main functions of the NR PDCPs 4-05 and 4-40 may include some of the following functions:

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs
Ciphering and deciphering
Timer-based SDU discard in uplink.

In the above description, the reordering function of the NR PDCP device refers to a function of sequentially rearranging PDCP PDUs received in a lower layer based on a PDCP sequence number (SN), and may include: a function of transferring data to an upper layer in the rearranged order, a function of directly transferring data without considering an order; a function of recording lost PDCP PDUs by rearranging an order; a function of reporting a state of the lost PDCP PDUs to a transmission end, and a function of requesting retransmission of the lost PDCP PDUs.

The main function of the NR RLCs 4-10 and 4-35 may include some of the following functions:

Transfer of upper layer PDUs
In-sequence delivery of upper layer PDUs
Out-of-sequence delivery of upper layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment.

In the above description, the in-sequence delivery function of the NR RLC device refers to a function of sequentially transferring RLC SDUs received from a lower layer to an upper layer, and may include: a function of rearranging and transferring, when a single RLC SDU is divided into multiple RLC SDUs and received, the divided multiple RLC SDUs; a function of rearranging the received RLC PDUs based on an RLC sequence number (SN) or a PDCP sequence number (SN); a function of recording lost RLC PDUs by rearranging an order; a function of reporting the state of the lost RLC PDUs to a transmission end; a function of requesting retransmission of the lost RLC PDUs; a function of sequentially transferring only RLC SDUs preceding the lost RLC SDU to the upper layer when there is a lost RLC SDU; a function of sequentially transferring all received RLC SDUs to the upper layer before a predetermined timer starts if the timer expires even when there is a lost RLC SDU; and a function of transferring all RLC SDUs received up to that point in time to the upper layer if the predetermined timer expires even when there is a lost RLC SDU. Further, the NR RLC may process the RLC PDUs in the received order (in order of arrival regardless of the order of serial numbers or sequence numbers), and may deliver the processed RLC PDUs to the PDCP device regardless of the order thereof (out-of-sequence delivery). In the case of a segment, the NR RLC may receive segments which are stored in a buffer or are to be received later, reconfigure the segments into one complete RLC PDU, and then process the complete RLC PDU and deliver the same to the PDCP device. The NR RLC layer may not include a concatenation function and may perform the function in the NR MAC layer or may replace the function with a multiplexing function of the NR MAC layer.

In the above description, the out-of-sequence delivery function of the NR RLC device refers to a function of directly delivering, to the upper layer regardless of order, the RLC SDUs received from the lower layer, and may include: a function of rearranging and transferring, when a single RLC SDU is divided into multiple RLC SDUs and received, the divided multiple RLC SDUs; and a function of storing the RLC SN of each of the received RLC PDUs, rearranging the RLC PDUs, and recording the lost RLC PDUs.

The NR MAC 4-15 and 4-30 may be connected to several NR RLC layer devices configured in one terminal, and the main functions of the NR MAC may include some of the following functions:
- Mapping between logical channels and transport channels
- Multiplexing/demultiplexing of MAC SDUs
- Scheduling information reporting
- Error correction through HARQ
- Priority handling between logical channels of one UE
- Priority handling between UEs by means of dynamic scheduling
- MBMS service identification
- Transport format selection
- Padding NR Physical layers (NR PHYs) 4-20 and 4-25 may generate an OFDM symbol by performing an operation of channel-coding and modulating upper-layer data and transmit the same through a radio channel, or may perform an operation of demodulating and channel-decoding the OFDM symbol received through the radio channel and transmit the same to the upper layer.

Figure 5:
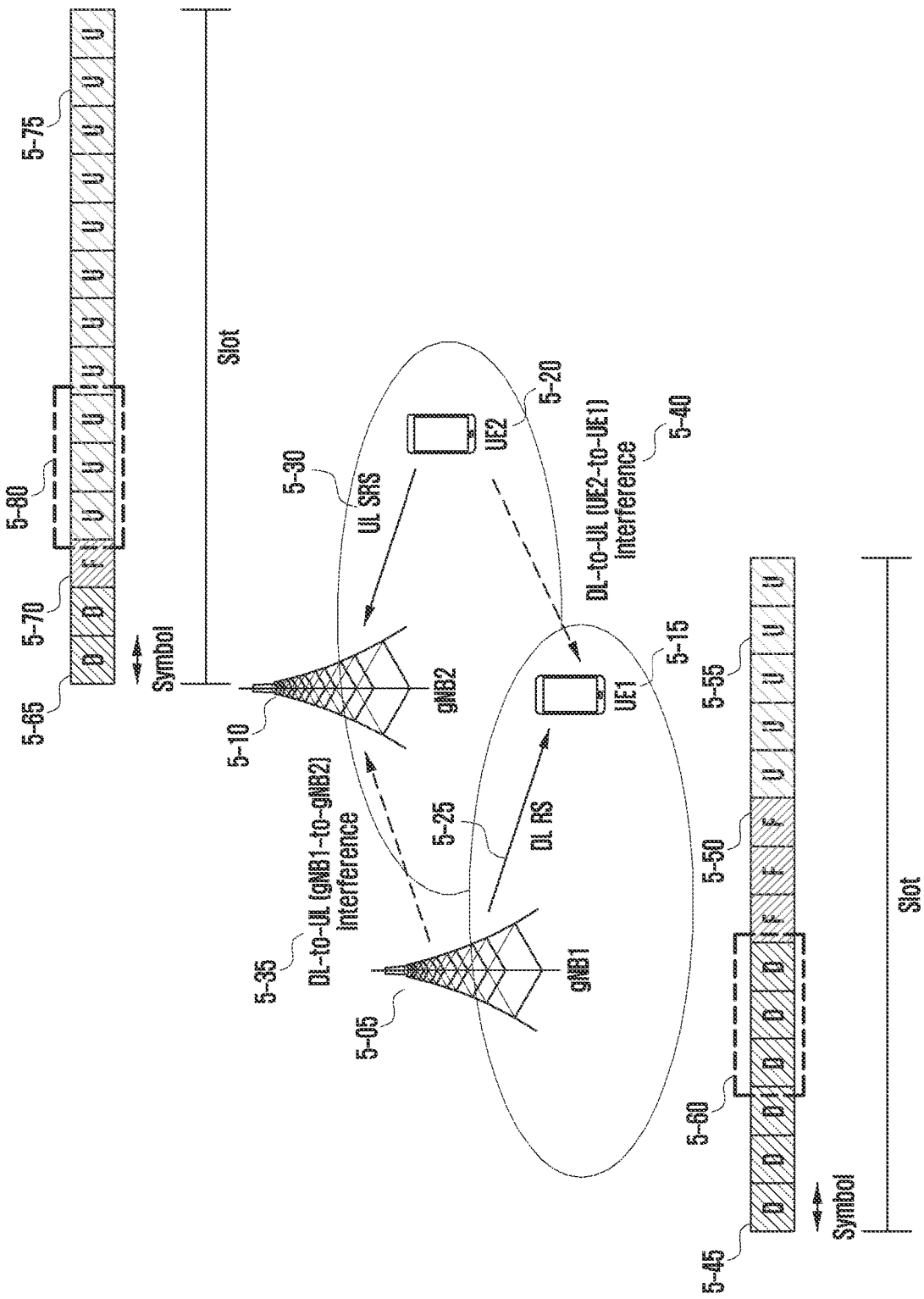
FIG. 5 illustrates cross-link interference in the case in which TDD cells are configured in a next-generation mobile communication system according to an embodiment of the disclosure.

FIG. 5 illustrates cross-link interference in the case in which TDD cells are configured in a next-generation mobile communication system according to an embodiment of the disclosure.

FIG. 5 illustrates an effect of cross-link interference (CLI) in operating dynamic TDD scheduling/configuration in the LTE and the NR system which can be applied to the entire disclosure, and the disclosure has been proposed to support the corresponding scenario. Further, from the viewpoint of a base station, remote interference management (RIM) for a terminal may be performed by receiving and applying a measurement value of the cross-link interference. This can be achieved, for example, by applying dynamic TDD scheduling.

Referring to FIG. 5, a mobile communication network having TDD cells configured therearound may exist. For example, as shown in FIG. 5, when gNB 1 5-05 (or base station 1) in a serving cell, to which terminal 1 5-15 is connected, supports a corresponding cell through TDD, gNB 2 5-10 (or base station 2) in a neighbor cell may also support the corresponding cell through TDD. There may exist terminal 2 5-20, which is connected to and serviced from the gNB 2 5-10. The transmission of data and a downlink reference signal 5-25, transmitted to corresponding terminals from base station 1, may be received (measured) as uplink interference 5-35 on base station 2. Further, the transmission of data and an uplink sounding reference signal (SRS) 5-30, transmitted by terminal 2 5-20 to base station 2 5-10 in the serving cell, may be received as cross-link interference 5-40 on a terminal, such as terminal 1, serviced by another serving cell (base station 1 5-05).

For example, a measurement value of the cross-link interference may include SRS—reference-signal received power (SRS-RSRP), which is an RSRP value of an SRS resource measured by a terminal in a current serving cell with respect to an SRS resource transmitted from a terminal in a neighbor cell, or a CLI received signal strength indicator (CLI-RSSI), which is the strength of a signal measured by a terminal in a current serving cell with respect to all signals transmitted from a terminal in a neighbor cell. Especially, in the disclosure, an effect of cross-link interference between terminals shown in 5-40 is considered.

A scheme of configuring an uplink/downlink symbol in the NR TDD system may be different from that in the LTE system, and is summarized below:
1) Cell-specific configuration: Allocate an uplink, downlink, and flexible symbol through system information or a common RRC signal
2) UE-specific configuration: Allocate an uplink or downlink symbol for resource allocated as flexible symbol through dedicated RRC message
3) Configuration through group common indication: Change flexible symbol through group-common physical downlink control channel (PDCCH), that is, slot format indicator (SFI)
4) UE-specific indication: Change flexible symbol through UE-specific PDCCH, that is, downlink control indicator (DCI)

Basically, a symbol for uplink/flexible/downlink transmission supported in a cell is allocated for each specific slot, and a symbol allocated for flexible transmission for each terminal can be changed according to other transmission schemes. In the above description, the symbol for flexible transmission is a flexible symbol which can be indicated as a symbol for uplink and downlink transmission according to a base station configuration. If a corresponding flexible symbol is not changed for another transmission, neither uplink transmission nor downlink transmission is performed in the corresponding symbol.

For example, as shown in FIG. 5, TDD pattern 1 5-45, 5-50, and 5-55 may be configured in a cell supported by base station 1. That is, in a slot including 14 symbols in total, six symbols 5-45 for downlink transmission, three symbols 5-50 for flexible transmission, and five symbols 5-55 for uplink transmission may be sequentially configured. In addition, TDD pattern 2 5-65, 5-70, and 5-75 may be configured in a cell supported by base station 2. That is, in a slot including 14 symbols in total, two symbols 5-65 for downlink transmission, one symbol 5-70 for flexible transmission, and 11 symbols 5-75 for uplink transmission may be sequentially configured. In this case, terminal 1 5-15 and terminal 2 5-20, which belong to base station 1 5-05 and base station 2 5-10, respectively, may transmit or receive data and a reference signal according to TDD resource information configured in corresponding serving cells. A specific downlink period 5-60 configured for terminal 1 and a specific uplink period 5-80 of the neighbor cell may overlap, and terminal 1 5-15 in the cell edge may be affected by interference from the neighbor cell. In other words, in the downlink period 5-60, terminal 1 5-15 may receive cross-link interference from terminal 2 5-20, which may lead to deterioration in communication performance. Due to the deterioration in communication performance, an interference signal affects a downlink signal which is intended to be received, the probability of reception and demodulation failure may increase, and thus a data transmission and reception rate may decrease.

With regard to the problem described above, when the SRS-RSRP and the CLI-RSSI are measured for the periods 5-60 and 5-80, for which cross-link interference measurement is indicated to a terminal by a base station, and the measurement value is reported to the base station, the base station may identify the extent of the cross-link interference on the terminal in the corresponding periods. The base station may adjust scheduling for resource allocation based thereon and may adjust an uplink/downlink transmission slot and symbol of the terminal through a dynamic TDD configuration.

The overall scenario shown in FIG. 5 is not limited to a scenario between TDD cells, and may be applied to a mobile communication network in which a TDD cell and an FDD cell are mixed or only FDD cells are included.

Figure 6:
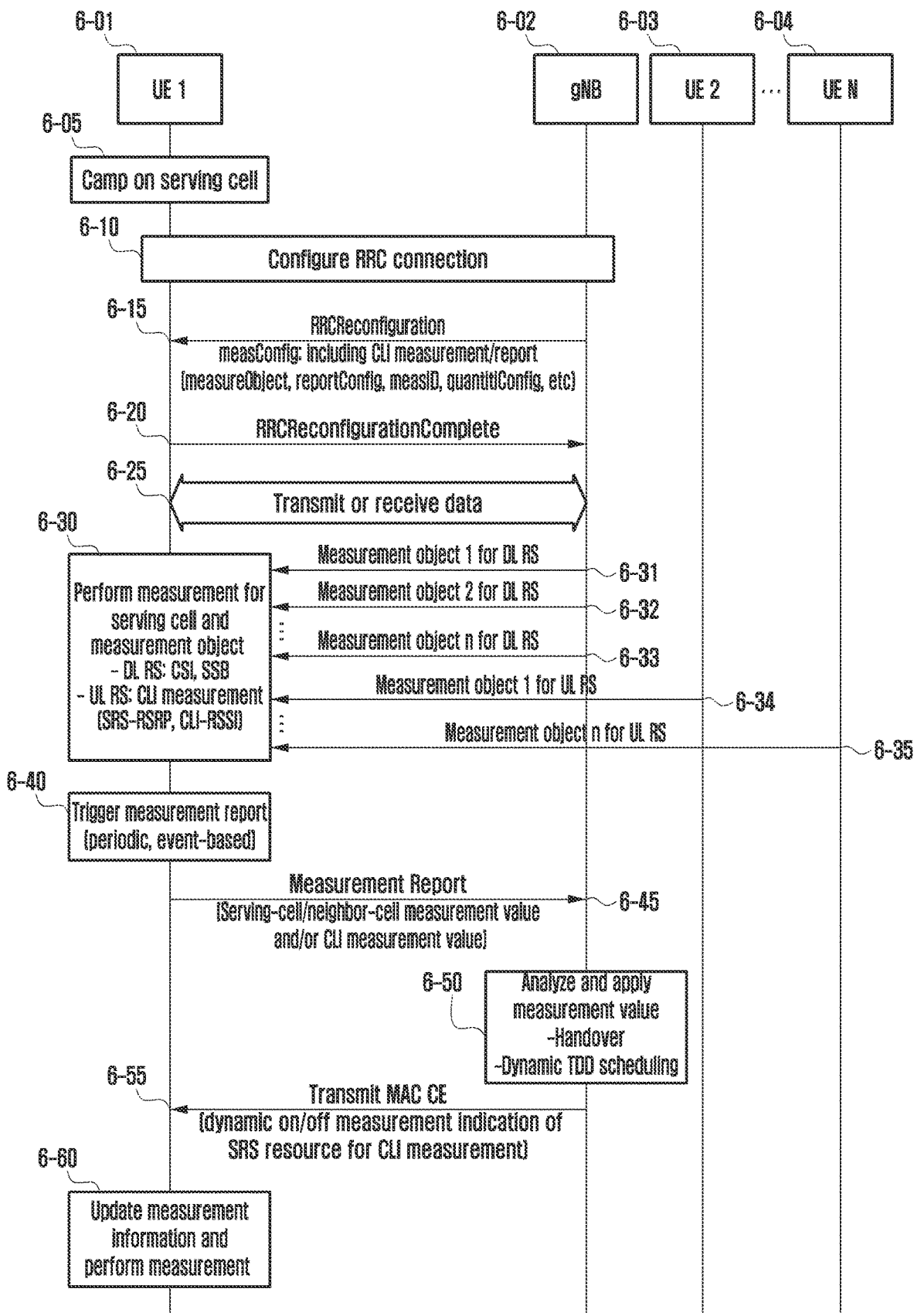
FIG. 6 illustrates overall process of receiving a measurement configuration including cross-link interference from a base station and transmitting a measurement report relating thereto to the base station by a terminal in a next-generation mobile communication system according to an embodiment of the disclosure.

FIG. 6 illustrates an overall process of receiving a measurement configuration including cross-link interference from a base station and transmitting a measurement report relating thereto to the base station by a terminal in the NR system according to an embodiment of the disclosure.

Terminal 1 6-01 in an idle mode (RRC_IDLE) searches for an appropriate cell in a cell (re)selection operation, camps on a corresponding base station 6-02 (6-05), and then performs RRC connection with the base station 6-02 according to generation of data to transmit (6-10), and the like. In the idle mode, a terminal may not transmit data because there is no network connection due to power-saving by the terminal, etc., and for data transmission, transition to a connected mode (RRC_CONNECTED) is required. Further, when the terminal camps on a cell, it means that the terminal is in the corresponding cell and receives a paging message to determine whether data is transmitted through a downlink. Terminal 1 6-01 is successfully connected to the base station 6-02 through the RRC, the state of the corresponding terminal transitions to the connected mode (RRC_CONNECTED), and the terminal in the RRC-connected mode may transmit or receive data to or from the base station.

As the terminal in the connected mode moves within the cell or outside the cell, the terminal may receive a command to move for data transmission or reception through a newly connected cell/base station after handover from another cell/base station. To this end, the base station may provide a configuration indicating measurement for another frequency/cell (L3 measurement: a downlink reference signal such as a CSI-RS or SSB), through an RRC message (6-15). The measurement indication may include a measurement object, a condition, and parameters so that a terminal reports a measurement result to the base station. In addition, in the disclosure, not only the existing report through the measurement of the downlink reference signal, but also the measurement and reporting of the cross-link interference described in FIG. 5 is configured and performed. In operation 6-15, the base station may provide measurement configuration information (measConfig) to the terminal, wherein, in the configuration information, CLI measurement- and reporting-related configuration information other than the existing measurement configuration and reporting of the downlink reference signal may be included. Further, in the measurement configuration information (measConfig), a measurement object configuration (measObject), a report configuration (reportConfig), the configuration of a measurement identifier related to the measurement object and report scheme (measID), a configuration indicating types of values to be measured (quantityConfig) and the like may be included. The following ASN.1 specifies measConfig signaling for reference.

Table 1 is an example of ASN.1 for a measurement configuration.

TABLE 1

| | |
|---|---|
| MeasConfig : := | SEQUENCE { |
|   measObjectToRemoveList | MeasObjectToRemoveList |
|     OPTIONAL, | -- Need N |
|   measObjectToAddModList | MeasObjectToAddModList |
|     OPTIONAL, | -- Need N |
|   reportConfigToRemoveList | ReportConfigToRemoveList |
|     OPTIONAL, | -- Need N |
|   reportConfigToAddModList | ReportConfigToAddModList |
|     OPTIONAL, | -- Need N |
|   measIdToRemoveList | MeasIdToRemoveList |
|     OPTIONAL, | -- Need N |
|   measIdToAddModList | MeasIdToAddModList |
|     OPTIONAL, | -- Need N |
|   s-MeasureConfig | CHOICE { |
|     ssb-RSRP | RSRP-Range, |
|     csi-RSRP | RSRP-Range |
|   } | |
|     OPTIONAL, | -- Need M |
|   quantityConfig | QuantityConfig |
|     OPTIONAL, | -- Need M |
|   measGapConfig | MeasGapConfig |
|     OPTIONAL, | -- Need M |
|   measGapSharingConfig | MeasGapSharingConfig |
|     OPTIONAL, | -- Need M |
| ... | |
| } | |

Further, the following description focuses on configuration information of the cross-link interference (refer to measurement object (MO)-related ASN.1 below).

Table 2 is an example of ASN.1 for an MO configuration.

TABLE 2

| | |
|---|---|
| MeasObjectNR : : = | SEQUENCE { |
| ssb Frequency | ARFCN- |
| ValueNR | OPTIONAL, -- Cond SSBorAssociatedSS |
| B | |
| ssbSubcarrierSpacing | SubcarrierSpacing |
| OPTIONAL, -- Cond SSBorAssociatedSSB | |
| smtc1 | SSB-MTC |
| OPTIONAL, -- Cond SSBorAssociatedSSB | |
| smtc2 | SSB-MTC2 |
| OPTIONAL, -- Cond IntraFreqConnected | |
| refFreqCSI-RS | ARFCN-ValueNR |
| OPTIONAL, -- Cond CSI-RS | |
| referenceSignalConfig | ReferenceSignalConfig, |
| absThreshSS-BlocksConsolidation | ThresholdNR |

TABLE 2-continued

| | |
|---|---|
| OPTIONAL, | -- Need R |
| absThreshCSI-RS-Consolidation | ThresholdNR |
| OPTIONAL, | -- Need R |
| nrofSS-BlocksToAverage | INTEGER (2..maxNrofSS-BlocksToAve |
| rage) OPTIONAL, | -- Need R |
| nrofCSI-RS-ResourcesToAverage | INTEGER (2..maxNrofCSI-RS-Resourc |
| esToAverage) OPTIONAL, | -- Need R |
| quantityConfigIndex | INTEGER (1..maxNrofQuantityConfig |
| }, | |
| offsetMO | Q-OffsetRangeList, |
|   cellsToRemoveList | PCI-List |
| | OPTIONAL, -- Need N |
|   cellsToAddModList | CellsToAddModList |
| | OPTIONAL, -- Need N |
|   blackCellsToRemoveList | PCI-Range IndexList |
| | OPTIONAL, -- Need N |
|   blackCellsToAddModList | SEQUENCE (SIZE (1..maxNrofPCI-Ran |
| ges) ) OF PCI-RangeElement | OPTIONAL, -- Need N |
|   whiteCellsToRemoveList | PCI-Range IndexList |
| | OPTIONAL, -- Need N |
|   whiteCellsToAddModList | SEQUENCE (SIZE (1..maxNrofPCI-Ran |
| ges) ) OF PCI-RangeElement | OPTIONAL, -- Need N |
| ... , | |
| [ [ | |
|   freqBandIndicatorNR-v1530 | FreqBandIndicatorNR |
| | OPTIONAL, -- Need R |
|   measCycleSCell-v1530 | ENUMERATED {sf160, sf256, sf320, |
| sf512, sf640, sf1024, sf1280} | OPTIONAL -- Need R |
| ] ] | |
| } | |

1. Measurement Object (MO) Configuration

In an MO configuration scheme, a new MO only for CLI measurement or a new MO which can be universally applied to measure signals other than the downlink reference signal may be introduced. As an example of measuring the signals other than the downlink reference signal, there is uplink delay measurement, and the like.

For example, the measObject newly introduced according to various embodiments may be defined to include a CLI-measurement-dedicated MO for CLI measurement only, or other types of MOs for measuring signals other than the downlink reference signal.

In addition, the newly introduced measObject may be defined to perform reporting differently from the existing report. For example, the new type of report may be a type of report for delivering log data.

When a new MO is introduced, information on a serving cell with which the new MO is associated may be required. For example, information about which cell the configured MO has timing based on may be additionally required. This is because a configuration on how a reference system frame number (SFN) of the MO to be measured is defined and how other measurement frequency and synchronization are configured is required. Alternatively, the MO may be applied to the configured cell (for example, PCell).

Further, with regard to the MO configuration, a scheme of adding a parameter for the CLI-measurement-related configuration is to be additionally considered. In the disclosure, two schemes of adding a CLI measurement parameter are proposed as below.

First CLI measurement parameter configuration scheme: This is a scheme of directly adding resource (SRS resource, etc.) configuration information for CLI measurement to the MO. This is a scheme of explicitly specifying information required to configure an SRS resource, in addition to and by extending from a corresponding information element (IE), when the existing measObjectNR is used. In the SRS resource configuration, the number of ports through which SRSs are transmitted, frequency-domain resource information and frequency hopping, an SRS resource transmission scheme (periodic, semi-periodic, or aperiodic), and the like, may be included, and the SRS resource configuration corresponds to information including how an SRS resource to be measured is transmitted, and through which time and frequency resources.

Second CLI measurement parameter configuration scheme: This is a scheme of indicating CLI measurement resource (SRS resource, etc.) configuration information configured in the MO with reference to the existing SRS configuration (SRS-Config). For example, index information (srs-ResourceId) on SRS-Resource to which an SRS resource is configured may be included, or the parameter may be indicated through index information (srs-ResourceSetId) on SRS-ResourceSet in which an SRS resource set is configured. To this end, in the case in which SRS-Config is provided in RRCReconfiguration, when configuring the SRS-Resource configured only for CLI measurement or the SRS-ResourceSet including the SRS-Resource configuration, information indicating that the SRS resource (or the SRS resource included in the SRS resource set) is for the SRS measurement (CLI measurement) resource configuration, not for the SRS transmission configuration may be included. The information may be realized so as to include a 1-bit indicator (CLI measurement indicator). When there is no indicator, configuration information for SRS transmission is used for determination.

In both schemes of adding a CLI measurement parameter, one MO may include multiple pieces of SRS resource configuration information, or multiple pieces of SRS resource configuration information may be configured to be included in one or more pieces of SRS resource set information. In addition, the MO for CLI measurement information may include either the SRS resource or the CLI-RSSI resource, or may include both the SRS resource and the CLI-RSSI resource. This may be configured in the structure of ASN.1 below.

Table 3 is an example of ASN.1 of an MO configuration for CLI measurement.

TABLE 3

| | |
|---|---|
| MeasObjectCLI-r16 : := | SEQUENCE { |
| cli-ResourceConfig-r16 | CLI-ResourceConfig-r16, |
| ... | |
| } | |
| CLI-ResourceConfig-r16 : := | SEQUENCE { |
| srs-ResourceConfig-r16 CLI-r16 } OPTIONAL, | SetupRelease { SRS-ResourceListConfig -- Need M |
| rssi-ResourceConfig-r16 gCLI-r16 } OPTIONAL | SetupRelease { RSSI-ResourceListConfi -- Need M |
| } | |
| SRS-ResourceListConfigCLI-r16 : := ces-r16) ) OF SRS-Resource, | SEQUENCE (SIZE (1..maxNrofSRS-Resour |
| RSSI-ResourceListConfigCLI-r16 : := esources-r16) ) OF RSSI-ResourceConfigCLI-r16, | SEQUENCE (SIZE (1..maxNrofCLI-RSSI-R |
| RSSI-ResourceConfigCLI-r16 : : | SEQUENCE { |
| rssi-ResourceId-r16 | RSSI-ResourceId-r16, |
| rssi-SCS-r16 | SubcarrierSpacing, |
| startPRB-r16 | INTEGER (0..2169) , |
| nrofPRBs-r16 eBlocksPlus1) , | INTEGER (4..maxNrofPhysicalResourc |
| startPosition-r16 | INTEGER (0..13) , |
| nrofSymbols-r16 | INTEGER (1..14) , |
| rssi-PeriodicityAndOffset-r16 | RSSI-PeriodicityAndOffset-r16, |
| ... | |
| } | |
| RSSI-ResourceId-r16 : := -r16-1) | INTEGER (0..maxNrofCLI-RSSI-Resources |
| RSSI-PeriodicityAndOffset-r16 : := | CHOICE { |
| sl10 | INTEGER (0..9) , |
| sl20 | INTEGER (0..19), |
| sl40 | INTEGER (0..39) , |
| sl80 | INTEGER (0..79) , |
| sl160 | INTEGER (0..159) , |
| sl320 | INTEGER (0..319) , |
| sl640 | INTEGER (0..639) , |
| ... | |
| } | |

Especially, the case in which the SRS resource is indicated for CLI measurement may be structurally different from the case in which the SRS resource is configured for transmission.

For example, as shown in Table 4 below, when the base station configures SRS resource transmission to the terminal, the configuration is made in a UL BWP in ServingCellConfig. That is, since a corresponding configuration is given for each BWP, BWP-related configuration information is not included in the SRS-Config itself. This is because the BWP information is already set in the upper-layer configuration.

Table 4 is an example of ASN.1 of SRS resource configuration for transmission of an SRS configured in an UL BWP in ServingCellConfig.

TABLE 4

| | |
|---|---|
| BWP-UplinkDedicated : := | SEQUENCE { |
| pucch-Config | SetupRelease { PUCCH-Config } OPTIONAL, -- Need M |
| pusch-Config | SetupRelease { PUSCH-Config } OPTIONAL, -- Need M |
| configuredGrantConfig fig } | SetupRelease { ConfiguredGrantCon OPTIONAL, -- Need M |
| srs-Config | SetupRelease { SRS-Config } OPTIONAL, -- Need M |
| beamFailureRecoveryConfig yConfig } | SetupRelease { BeamFailureRe- cover OPTIONAL, -- Cond SpCellOnly |
| ... | |
| } | |

However, when the MO for CLI measurement includes SRS-Config, the measurement configuration is not configured for each BWP, but for each serving cell. Accordingly, when the existing SRS-Config IE is used, BWP information in which the SRS resource is configured may be omitted, and information on the BWP in which the SRS resource to be measured is actually transmitted may not be identified. From the perspective of the terminal for measuring CLI, the terminal may measure the SRS resource that is measured in an activated DL BWP, but may not measure the entire SRS of the terminal for transmitting the SRS resource, whereby an accurate threshold may not be applied, and reliability of application of the measurement result may be lost. In the disclosure, the SRS resource configuration information for CLI measurement includes BWP information which is applied when receiving the SRS resource in SRS-Config. For example, the BWP information may include the ID of a BWP to which a terminal for transmitting the SRS resource actually transmits the SRS resource, or time-frequency resource information of the corresponding BWP. For example, the BWP may include information on a frequency-domain starting position (absolute radio frequency channel number (ARFCN)) and bandwidth, the number of physical resource blocks (PRBs), or the like.

The frequency configuration of the SRS resource for measurement is signaled in SRS-Config as shown below.

| | |
|---|---|
| freqDomainPosition | INTEGER (0 . . . 67), |
| freqDomainShift | INTEGER (0 . . . 268), |

However, the corresponding information means the frequency-domain position of the SRS resource in a specific serving cell and BWP, and thus an absolute frequency-domain position of the SRS resource may not be acquired. This is because the CLI measurement object may not be configured for each frequency, but all SRS resources configured for neighbor terminals may be configured in one MO. In addition, referring to RAN1 TS 38.211 below, the frequency-domain starting position of the SRS resource may be acquired as shown below.

The frequency–domain starting position $k_0^{(p_i)}$ is defined by:

$$k_0^{(p_i)} = \overline{k}_0^{(p_i)} + \sum_{b=0}^{B_{SRS}} K_{TC} M_{sc,b}^{SRS} n_b$$

where $$\overline{k}_0^{(p_i)} = n_{shift} N_{sc}^{RB} + k_{TC}^{(p_i)}$$

$$k_{TC}^{(p_i)} = \begin{cases} (\overline{k}_{TC} + K_{TC}/2) \bmod K_{TC} & \text{if } n_{SRS}^{cs} \in \{n_{STS}^{cs,max}/2, \ldots, n_{SRS}^{cs,max} - 1\} \text{ and } N_{ap}^{SRS} = 4 \text{ and } p_i \in \{1001, 1003\} \\ \overline{k}_{TC} & \text{otherwise} \end{cases}$$

If $N_{BWP}^{start} \leq n_{shift}$ the reference point for $k_0^{(p_i)} = 0$ is subcarrier 0 in common resource block 0, otherwise the reference point is the lowest subcarrier of the BWP.

That is, in order to accurately identify the position of the SRS resource from other terminals to be measured, at least $N_{BWP}^{Start}$ needs to be additionally configured. Possible solutional options may be as shown below:

Option 1: Absolute frequency position and bandwidth information or number of PRBs (as described above)

Option 2: Serving cell information (frequency information (this is omissible when MO includes only SRS resource, which is in same frequency as that of current terminal)+cell ID)+bandwidth starting point of corresponding cell or BWP ($N_{BWP}^{Start}$)

Option 3: Frequency-domain starting point required to calculate the frequency-domain location of SRS resource: $N_{BWP}^{Start}$.

2. Measurement Report (MR) Configuration

In the measurement object configuration operation, the MO of CLI measurement is configured, and the terminal measures a resource configured for the corresponding MO. In this case, a scheme of reporting the MO to the base station needs to be determined, and the report condition and scheme may be included in the measurement report configuration. In addition, the measurement report configuration may be configured so as to be associated with a specific MO (the MO to which CLI measurement is configured). In the following description, measurement report schemes will be proposed and the detailed features thereof will be described.

A. Periodical Report Configuration

According to various embodiments, a new reference signal type for periodical report of CLI measurement may be defined. That is, a CLI periodical-report-dedicated information element (IE) may be introduced, and a parameter related thereto may be configured. The periodicity, the number of reports, information on report resources, and the maximum number of resources included in the report may be included in the corresponding configuration, as referred to in ASN.1 below. Table 5 is an example of ASN.1 of a CLI periodical report configuration.

TABLE 5

| | |
|---|---|
| CLI-PeriodicalReportConfig-r16 ::= | SEQUENCE { |
| reportInterval-r16 | ReportInterval, |
| reportAmount-r16 | ENUMERATED { r1, r2, r4, r8, r16, r32, r64, infinity} , |

TABLE 5-continued

| | |
|---|---|
| reportQuantityCLI-r16 | MeasReportQuantityCLI-r16, |
| maxReportCLI-r16 | INTEGER (1..maxCLI-Report-r16), |
| ... | |
| } | |

B. Event-based report configuration

According to various embodiments, a new event-based report dedicated to the CLI measurement report may be introduced.

New event: In the case where, among measurement values related to MO, SRS-RSRP or CLI-RSSI exceeds configured threshold The event may have the same procedure as that of existing event A1, but the type of reference signal to be measured may change, and thus an event dedicated thereto is introduced.

For example, a new event (event I1) may have the same parameters as those of event A1, but the type of reference signal applied to corresponding a1-Threshold and the threshold range may change. In other words, as shown in Table 6, a new MeasTriggerQuantity-CLI may be defined and used for CLI measurement only. This is because the RSRP threshold range applied to the existing downlink CSI-RS and SSB and the RSRP threshold range applied to the uplink SRS may be different from each other. Accordingly, a new mapping table and index for SRS-RSRP measurement value and threshold mapping may be introduced and referred to. In addition, as described below, either SRS-RSRP or CLI-RSSI may be configured, or both SRS-RSRP and CLI-RSSI may be configured to the MO for CLI. An event may occur for one resource type. The resource type for triggering the event is to be specified. The resource type may be specified according to one of two schemes below.

Configure a threshold (i1-Threshold-r16) type used to trigger event to be either SRS-RSRP or CLI-RSSI. That is, configure MeasTriggerQuantityCLI-r16 value to be either SRS-RSRP-Range-r16 or CLI-RSSI-Range-r16.

Introduce IE indicating explicit resource type, for example, CLI-measurement type (triggering type)=CHOICE [SRS, RSSI]. That is, specify one of two resources.

Table 6 is an example of ASN.1 of a MeasTriggerQuantity-CLI configuration dedicated to CLI measurement.

TABLE 6

```
CLI-EventTriggerConfig-r16      SEQUENCE {
    eventId-r16                 CHOICE {
        eventI1-r16             SEQUENCE {
        il-Threshold-r16
MeasTriggerQuantityCLI-r16,
        reportOnLeave-r16       BOOLEAN,
        hysteresis-r16          Hysteresis,
        timeToTrigger-r16       TimeToTrigger
    },
    ...
    },
    reportInterval-r16          ReportInterval,
    reportAmount-r16            ENUMERATED { r1, r2, r4,
r8, r16, r32, r64, infinity} ,
    maxReportCLI-r16            INTEGER (1..maxCLI-Report-
r16),
    ...
}
MeasTriggerQuantityCLI-r16 : :=  CHOICE {
    srs-rsrp-r16                SRS-RSRP-Range-r16,
    cli-rssi-r16                CLI-RSSI-Range-r16
}
```

In addition, when multiple SRS resources are configured to new event I1, the event-based SRS resource measurement report scheme below may be considered according to the number of times of reporting and the scheme thereof.

First scheme of reporting multiple SRSs: This is a reporting scheme based on a measurement value of each configured SRS resource. When at least one of the SRS resources configured to the MO exceeds a threshold and triggers a measurement report, the report may be made including measurement values for all SRS resources included in the MO, or including only a measurement value for the SRS resource that triggered the event.

Second scheme of reporting multiple SRSs: This is a reporting scheme based on an average value of all configured SRS resources. When an average of measurement values of SRS resources configured to the MO exceeds a threshold and triggers a measurement report, the report may be made including measurement values for all SRS resources included in the MO, or including only an average measurement value of SRS resources that triggered the event.

In addition, a 1-bit indicator for selecting the first scheme of reporting multiple SRSs and the second scheme of reporting multiple SRSs may be introduced.

The terminal having received the measurement value configured as above transmits a confirmation message indicating that the terminal has successfully received the configuration information from the base station (6-20). To this end, an RRCReconfigurationComplete message may be used.

In operation 6-25, the terminal may transmit or receive data to or from the base station. In operation 6-30, the terminal starts performing measurement for a measurement resource of the serving cell and the measurement object 6-31, 6-32, 6-33, 6-34 of terminal UE 2 6-03, and 6-35 of terminal UE N 6-04 in which CLI measurement is included, configured in operation 6-15 above. In operation 6-30 above, for the MO to which a downlink reference signal is configured, the terminal measures the result of the cell-level measurement, and for the CLI-measurement-related MO, the terminal measures configured SRS-RSRP and CLI-RSSI and determines the report condition configured by the base station. The configuration condition may be configured differently depending on whether measurement within a frequency or measurement between frequencies is performed. Especially, for the configuration of channel measurement between frequencies, carrier frequency information indicating the corresponding frequency is required.

In operation 6-40, the terminal may trigger a measurement report in accordance with the configured measurement report condition, wherein the triggering scheme may include a periodical reporting scheme and an event-based reporting scheme. The detailed reporting configuration may follow the reporting scheme described in operation 6-15 above. Especially, when the terminal receives configuration of the MO for CLI and performs measurement, the terminal performs measurement for an SRS resource that is not deactivated through a MAC CE, among SRS resources belonging to an activated DL BWP in which the terminal is currently operating. Here, measurement of the SRS resource that is not deactivated means that measurement is performed only for SRS transmission from the perspective of the terminal. In addition, the terminal may measure only an RSSI resource which belongs to a current active DL BWP.

In operation 6-45, the terminal reports a measurement result to the base station through the RRC message, wherein the report message may include at least one of a serving cell measurement value, a neighbor cell measurement value, or a CLI measurement value. That is, all measurement values may exist, or respective measurement values may be included. The operation of measurement and measurement reporting are performed in operation 6-45 by the terminal when the periodical report condition and an event-triggering report condition are satisfied, and has the following features.

When an event-based report is performed by the terminal in operation 6-45, that is, when measID is associated with measObjectCLI and ReportConfig is configured with event I1, the terminal determines whether an entering condition or a leaving condition is satisfied among CLI-measurement types of CLI measurement resources indicated in ReportConfig. When at least one resource newly satisfies the entering condition, or when at least one resource newly satisfies the leaving condition, the terminal generates a measurement report and reports the same. In the measurement report, only a serving cell measurement result and a CLI measurement result are included. The value used for the measurement report may be the actual measurement value or an average value of configured SRS/RSSI resources.

In addition, the measurement value may not include a measurement value for neighbor cells other the existing serving cell. A MeasObjectNR measurement scheme, which is measurement and reporting of a downlink signal in the current NR, performs measurement for a frequency area satisfying a predetermined condition, among indicated frequency areas, wherein the measurement result includes a serving cell measurement result, a serving frequency neighbor cell measurement, and a non-serving frequency neighbor cell measurement result. Further, for an IE for the measurement report, instead of the existing ReportConfigNR, a new report configuration ReportConfigNR-CLI may be introduced. Alternatively, the measurement report may be restricted so that, when performing the CLI measurement reporting, measurement reporting for the serving cell is also performed at all times. The measurement report may be performed for each of the SRS-RSRP and the CLI-RSSI.

Later, in operation 6-50, the base station may analyze the measurement value based on the measurement value received from the terminal and apply the same for network management. For example, the base station may apply the analysis to a handover procedure and dynamic TDD scheduling and perform the same.

In addition, in the disclosure, a method of dynamically turning on/off measurement indication with respect to some of SRS resource information configured in the CLI MO configured through an RRC message by introducing a new MAC CE for optimization through the dynamic application of the CLI measurement is proposed. In operation 6-55, the base station may transmit the MAC CE to the terminal to indicate dynamic update of the measurement indication with respect to some of SRS resources configured to the CLI MO. In operation 6-60, the terminal may update the measurement information with the information indicated by the MAC CE and perform the related measurement. A detailed description of the MAC CE structure and feature will be provided below in connection with the following embodiment.

FIG. 7 illustrates the structure of a MAC CE indicating dynamic SRS measurement for cross-link interference according to an embodiment of the disclosure. The disclosure enables dynamic turning on/off of measurement indication with respect to some of SRS resource information configured in the CLI MO configured through an RRC message, thereby minimizing delay time. The possible options therefor are described below.

A first option for dynamically updating a resource to be measured among the SRS resources configured to MO for CLI is to introduce a bitmap-type SRS resource indication MAC CE.

Referring to FIG. 7, the detailed structure and operation of the bitmap-type SRS resource indication MAC CE according to various embodiments are as follows.

Reserved bit 7-05: This is required for byte alignment of the MAC CE.

Serving cell ID 7-10 (6 bits): This is a serving cell identifier to which an SRS resource for CLI measurement is configured.

BWP ID 7-15 (2 bits): This is a BWP identifier to which an SRS resource for CLI measurement is configured. Alternatively, information corresponding to the frequency-domain starting position ($N_{BWP}^{Start}$) to which an SRS resource is configured, may be added. In this case, the number of required bits may be determined according to the determination made later, and may exceed 2 bits as shown in FIG. 7.

SRS resource ID 7-20 (64 bits): This is an SRS resource ID for CLI measurement in the RRC configuration. For an SRS resource ID requiring measurement, the SRS resource ID is set to 1, and for an SRS resource ID requiring no measurement, the SRS resource ID is set to 0. The size of the bitmap is configured to be the maximum value of the SRS resource configured to be measured. If identifiers are mixed and used for the SRS resource for measurement and the SRS resource for transmission, the size of the bitmap increases in proportion to the total amount of all SRS resources.

A second option for dynamically updating a resource to be measured among the SRS resources configured for CLI MO is to introduce an explicit ID-type SRS resource indication MAC CE.

Reserved bit 7-25 and 7-50: This is required for byte alignment of the MAC CE.

Serving cell ID 7-30 and 7-55 (6 bits): This is a serving cell identifier to which an SRS resource for CLI measurement is configured.

BWP ID 7-35 and 7-60 (2 bits): This is a BWP identifier to which an SRS resource for CLI measurement is configured.

Activated/deactivated indicator (A/D) 7-40 and 7-65 (1 bit): This is a dynamic activated/deactivated indicator of a CLI measurement SRS resource configured through the RRC.

SRS resource ID 7-45 and 7-70 (7 bits): This is a CLI measurement SRS resource ID configured through the RRC, and an activated indicator and a deactivated indicator function as a set. When the activated/deactivated indicator is set to 1, CLI measurement for the SRS resource ID is performed, and when the activated/deactivated indicator is set to 0, the CLI measurement for the SRS resource ID is aborted.

In the MAC CE structure, there may exist multiple MOs for CLI, and the SRS resource may be configured for each MO. Accordingly, it is also possible to control the measurement of the SRS resource included in a specific MO as a whole. In this case, for an identifier capable of referring to the MO, for example, measObjectID or measID may be used. Alternatively, in the MAC CE described above, a field including measObjectID may be added.

Figure 8:
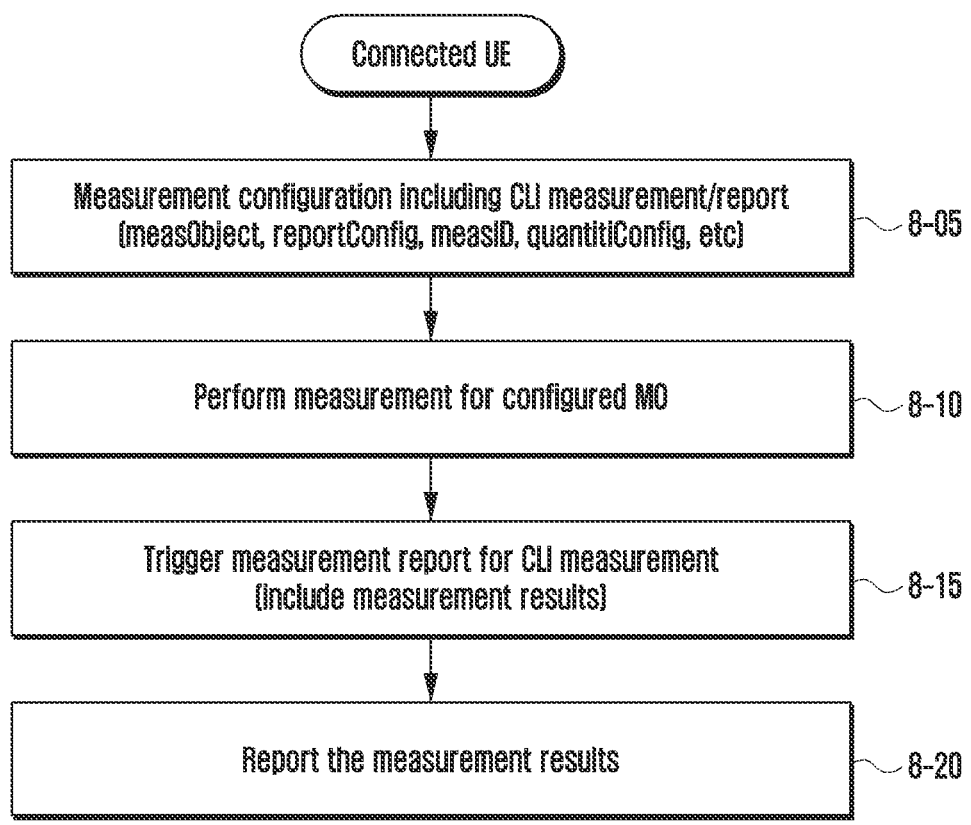
FIG. 8 illustrates overall terminal operation for cross-link interference measurement and reporting according to an embodiment of the disclosure.

FIG. 8 illustrates overall terminal operation for cross-link interference measurement and reporting according to an embodiment of the disclosure.

In FIG. 6 above, the entire procedure of the cross-link interference measurement and reporting is illustrated from a system point of view, and FIG. 8 will describe the cross-link interference measurement and reporting in a big frame of terminal point of view.

Referring to FIG. 8, in operation 8-05, an RRC-connected terminal may receive a measurement configuration from a base station, and the configuration may include measObject, reportConfig, measID, quantityConfig, etc. Especially, the MO configuration specifies a signal to be measured and a resource through the signal is to be measured. A CSI-RS and SSB, which is a type of existing downlink reference signal, may be configured, and in the disclosure, CLI measurement information including the SRS-RSRP and the CLI RSSI is included in the MO configuration. For the CLI MO configuration, the following may be considered, and a detailed information and proposal related thereto are made with reference to FIG. 6.

Introduction of new MO for CLI measurement

Scheme of including SRS/RSSI resource configuration information for CLI (including, in the MO, configuration for the SRS/RSSI resource to be measured)

Scheme of mapping BWP information or frequency information at time of CLI SRS resource configuration Further, in the measurement configuration in the above operation, a report configuration may be added, and in particular, a report condition associated with the MO for CLI may be included. In the disclosure, the report configuration will be focused on an event-based report, and the detailed information and proposal are made with reference to FIG. 6.

Definition of event for case in which SRS-RSRP/CLI-RSSI measurement value exceeds threshold: Introduction of new event I1

Number of reports and report scheme in case in which multiple SRS resources are configured Scheme of reporting only measurement value of SRS resource that triggered event, or of reporting all measurement values of all configured SRS resources Scheme in which measurement value is determined by following actual SRS-RSRP value or by using average measurement value of configured SRS resources Scheme of using threshold that is different from threshold used for existing SRS measurement and event triggering (for SRS/RSSI only) so as to introduce new CLI measurement report configuration In operation 8-10, the terminal performs measurement for the MO configured according to the measurement configuration received in operation 8-05. In operation 8-10, when there is an MO configuration associated with the CLI, measurement is performed for an SRS/RSSI resource configured in the MO, and in this case, the measurement is performed in time and frequency resources in an activated downlink BWP.

In operation 8-15, the terminal identifies a report condition for the measured CLI measurement, and includes the measured value in a measurement result and prepares a report when the report condition is satisfied. The measurement report condition may be used both for the periodical report and the event-based report, and the event-based report may be triggered when the value measured based on the SRS-RSRP/CLI-RSSI exceeds a threshold and a new event S1 is introduced.

In operation 8-20, the terminal receives, through an RRC message, the measurement result including the measurement value generated in operation 8-15 and transmits the same. Here, according to whether the triggered resource is the SRS-RSRP or the CLI-RSSI, the measurement report is separately performed. Later, the terminal may perform handover or resource reconfiguration according to an RRCReconfiguration message transmitted from the base station.

Figure 9:
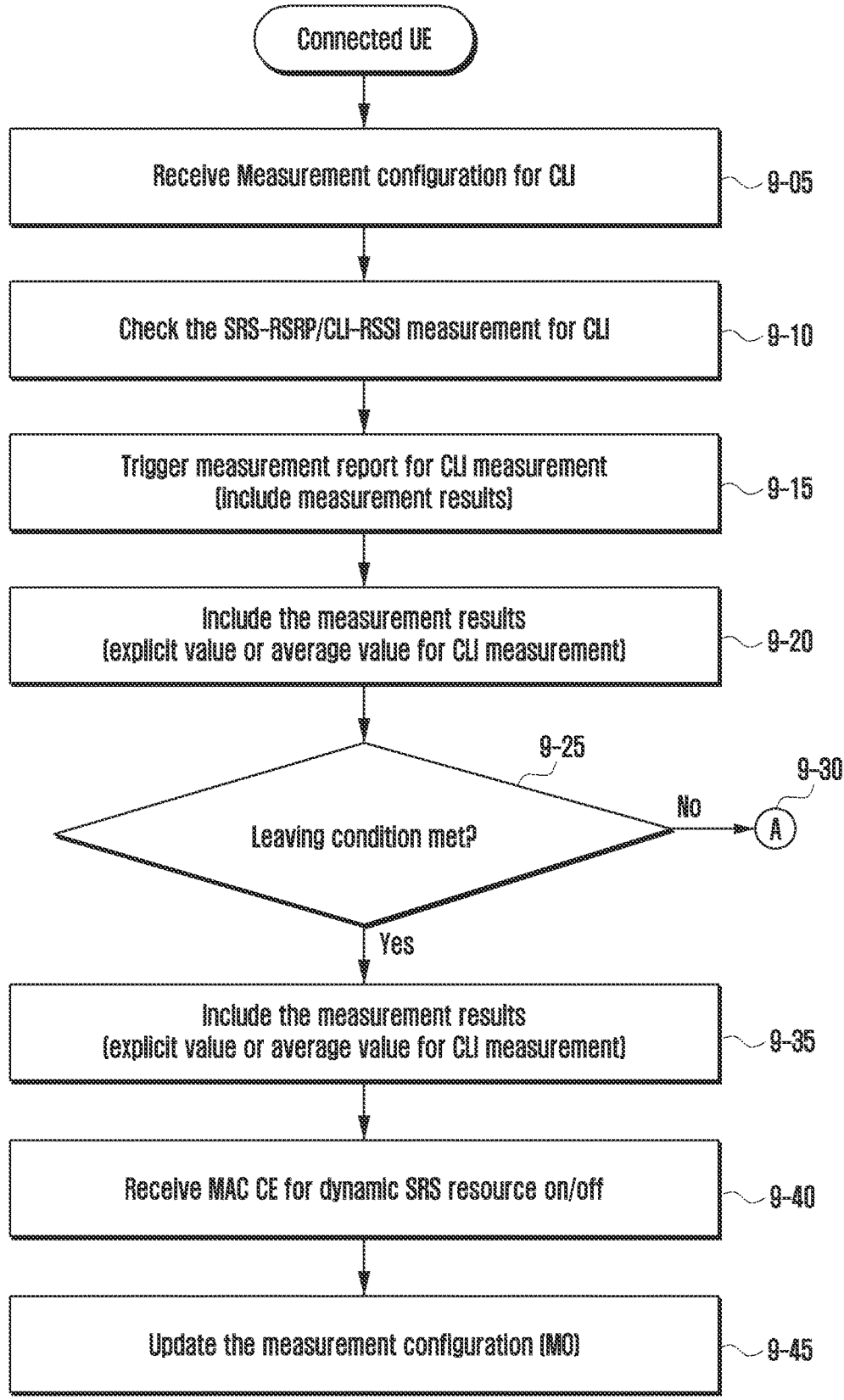
FIG. 9 illustrates overall terminal operation in the case in which measurement report is configured for cross-link interference according to an embodiment of the disclosure.

FIG. 9 illustrates overall terminal operation in the case in which measurement report is configured for cross-link interference according to an embodiment of the disclosure.

Referring to FIG. 9, in operation 9-05, the terminal receives CLI measurement configuration information, wherein the terminal receives a CLI MO configuration, configuration of event-based measurement report and periodical measurement report associated with the CLI MO, and the like. The configuration information may be included in the measurement configuration information and received through an RRCReconfiguration message. The detailed description of the configuration is made with reference to operation 6-15 in FIG. 6.

In operation 9-10, the terminal performs CLI measurement according to the configured measurement and reporting condition. When a periodical report is configured as a CLI measurement report condition, the terminal performs measurement according to the configured periodicity and report condition. When an event-based measurement report is configured for the CLI measurement MO, the terminal triggers the event-based report according to whether the measurement values (SRS-RSRP/CLI-RSSI) for the SRS resource and CLI-RSSI in the configured CLI measurement MO exceed respective thresholds. The detailed procedure is operated in the same way as existing event A1, and the threshold applied thereto may be redefined to have a value in a new range. This is because the RSRP range of the uplink reference signal and the RSRP range of the downlink reference signal may be applied in different ways. If a new RSRP range is introduced, it may be redefined for each of ranges for the SRS-RSRP and the CLI-RSSI measurement, and may be applied only to the CLI measurement, particularly, the SRS-RSRP and CLI-RSSI mapping. A new event (for example, event I1) for the measurement report may be introduced, and the procedure of event A1 may be applied for the entire procedure without any change. The ReportOnLeave configuration and operation may be introduced without any change, and thus the introduction of an event such as event A2 (or introduction of event 12) may be omitted. Event 12 may have a condition in which the event is triggered when the measured SRS-RSRP/CLI-RSSI value decreases to a value less than or equal to the threshold. In the disclosure, the corresponding event is not introduced, and event A1 (I1) and ReportOnLeave may replace the corresponding event as functions similar thereto.

In operation 9-15, the terminal triggers measurement reporting and includes a corresponding measurement value when the CLI measurement result satisfies a specific event condition according to the measurement result acquired in operation 9-10.

In operation 9-20, depending on the report scheme that is configured for the terminal, the terminal may operate in different ways. That is, when one or more of configuration of multiple SRS resources and RSSI resource configuration is included in the MO configured for CLI measurement, the terminal may trigger a measurement value applied for event triggering based on an actual measurement value or an average measurement value. The terminal includes the actual CLI measurement value or the average measurement value in the measurement result according to the determined measurement report scheme. In this case, only the measurement information on the SRS and RSSI resource that triggered the event may be included, or the measurement information on all SRS resources/RSSI resources included in the configured MO may be included. Further, the measurement information may include either the SRS-RSRP value or the CLI-RSSI value, and this means that the measurement report is performed separately depending on the resource type.

When the leaving condition is satisfied for the corresponding event in operation 9-25, the report for the corresponding event is performed again (9-35, performing operation 9-20 again at the current point in time). The entering condition and the leaving condition for event I1 are as follows. When the leaving condition is not satisfied in operation 9-25, no separate operation is performed (9-30).

Inequality I1-1 (Entering condition)

$$Mi - Hys > Thresh$$

Inequality I1-2 (Leaving condition)

$$Mi + Hys < Thresh$$

In operation 9-40, the terminal may receive a MAC CE indicating dynamic measurement indication for an SRS resource, wherein with respect to some of SRS resources configured to the CLI MO, dynamic update of the measurement indication may be indicated. In operation 9-45, the terminal updates the measurement information with the information indicated by the corresponding MAC CE, and performs the related measurement. Later, the terminal performs the CLI measurement and reporting again based on the configured information.

Figure 10:
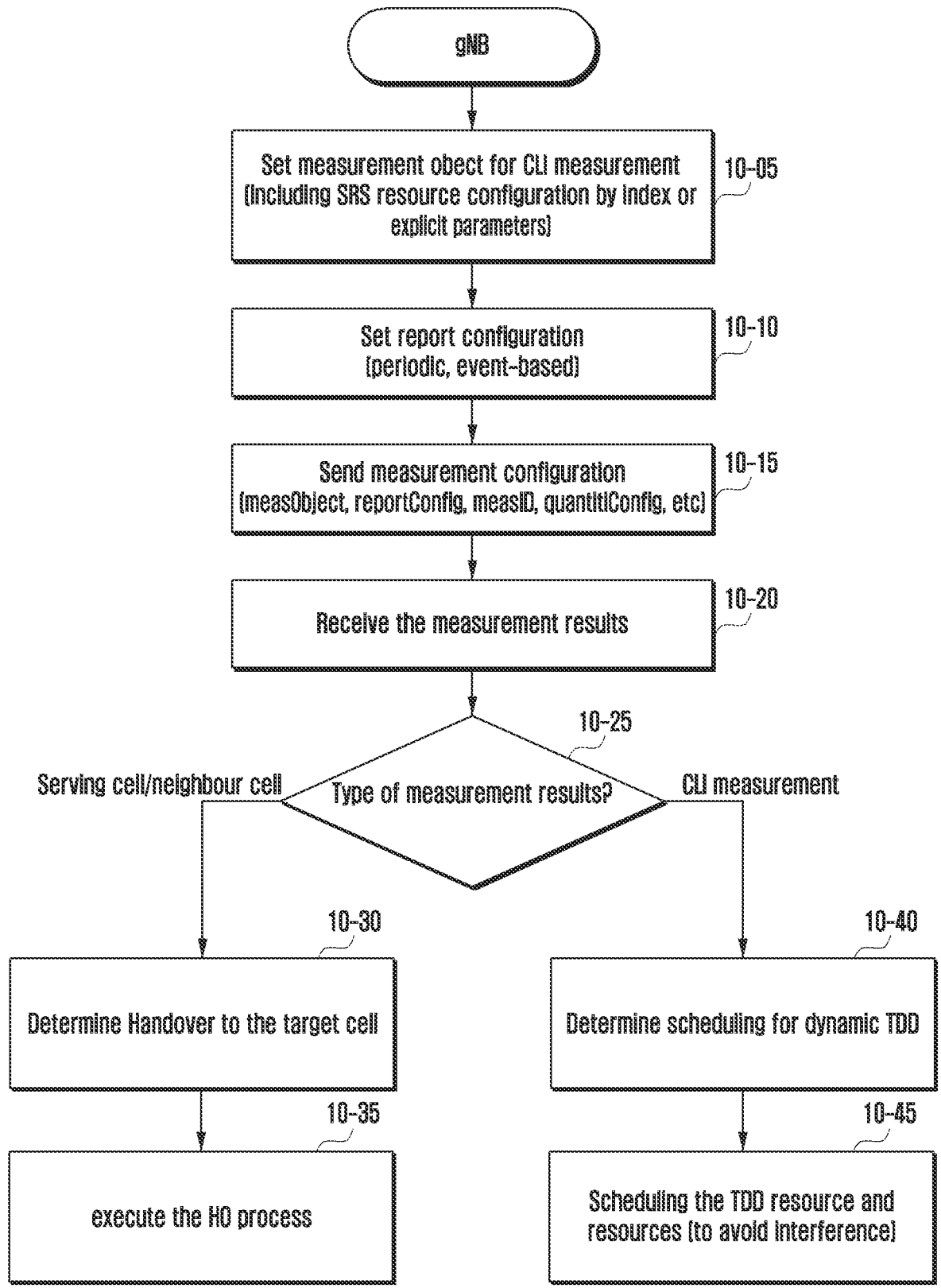
FIG. 10 illustrates overall base station operation for cross-link interference measurement and reporting according to an embodiment of the disclosure.

FIG. 10 illustrates overall base station operation for cross-link interference measurement and reporting according to an embodiment of the disclosure.

Especially, FIG. 10 includes performing a CLI measurement configuration and transmitting the CLI measurement configuration. The detailed description is made in FIG. 6.

When there is an RRC-connected terminal, a corresponding base station may provide measurement configuration information to the terminal through the RRC configuration in order to sequentially apply the information for terminal mobility and scheduling. In the disclosure, the description will be focused on the CLI measurement, and in connection with FIG. 10, basic descriptions will be omitted, and only a description of CLI measurement will be made.

Referring to FIG. 10, in operation 10-05, the base station may perform CLI measurement configuration, wherein, for the configuration, an MO configuration including an SRS resource configuration may be set. A scheme of configuring the MO in operation 10-05 may include: using existing measObjectNR without change; and introducing a new MO (measObjectNR-CLI) and including a CLI-dedicated configuration. A detailed description of the corresponding configuration is made with reference to operation 6-15 in FIG. 6.

In operation 10-10, the base station may set configuration information for the report, among pieces of measurement configuration information for CLI measurement. In operation 10-10, a periodical report and an event-based measurement report, which are report configuration schemes, may be configured separately, and parameters related to the condition and scheme required for the corresponding report may be included. A detailed description of the configuration scheme is made with reference to operation 6-15 in FIG. 6.

In operation 10-15, the base station includes the measurement configuration information configured in operations 10-05 and 10-10 in an RRCReconfiguration message and transmits the configuration information for CLI measurement and reporting to the terminal through the RRCReconfiguration message. Basically, the measurement configuration procedure in the NR system is applied, and the terminal, having received the information, performs the CLI measurement and reporting according to the information transmitted from the base station.

In operation 10-20, the base station receives a measurement result included in the measurement report transmitted from the terminal. Here, according to the report condition associated with the MO related to the CLI measurement, the CLI measurement result is included in the report.

When the measurement report received in operation 10-25 corresponds to a measurement result for a neighbor cell and a serving cell associated with the existing downlink reception signal, the base station may determine to perform handover based on the received measurement value, in operation 10-30. Further, in operation 10-35, the handover operation may be performed.

However, in operation 10-40, when the measurement report received in operation 10-25 corresponds to a measurement result associated with the CLI measurement value, the base station may determine to dynamically allocate a TDD resource based on the corresponding measurement result. In operation 10-45, the base station may perform the dynamic TDD scheduling directly, or may perform scheduling in the existing resource for reducing interference. In the above description, dynamic TDD resource scheduling means that, when it is determined based on the CLI measurement result from the terminal that there is large cross-link interference in the corresponding DL measurement resource, the corresponding resource is not changed to an uplink transmission resource in the TDD resource. In addition, a resource having less interference may be changed to an uplink transmission resource (time).

Figure 11:
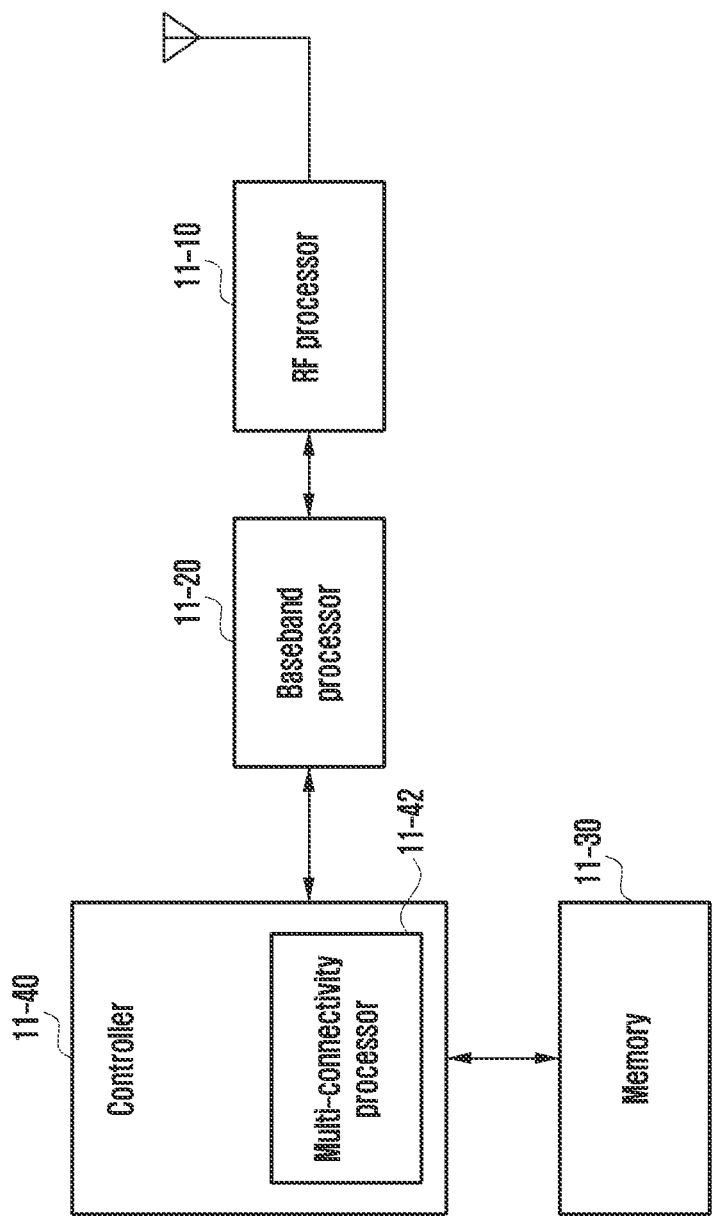
FIG. 11 is a block diagram illustrating the internal structure of a terminal according to an embodiment of the disclosure.

FIG. 11 is a block diagram illustrating the internal structure of a terminal according to an embodiment of the disclosure.

Referring to FIG. 11, the terminal includes a radio-frequency (RF) processor 11-10, a baseband processor 11-20, a memory 11-30, and a controller 11-40.

The RF processor 11-10 performs a function of transmitting or receiving a signal through a radio channel, such as signal band conversion and amplification. That is, the RF processor 11-10 up-converts a baseband signal, provided from the baseband processor 11-20, to an RF-band signal and transmits the converted RF-band signal through an antenna, and down-converts an RF-band signal received through an antenna to a baseband signal. For example, the RF processor 11-10 may include a transmission filter, a reception filter, an amplifier, a mixer, an oscillator, a digital-to-analog converter (DAC), an analog-to-digital converter (ADC), and the like. Although only a single antenna is illustrated in FIG. 11, the terminal may include multiple antennas. In addition, the RF processor 11-10 may include multiple RF chains. Furthermore, the RF processor 11-10 may perform beamforming. For beamforming, the RF processor 11-10 may adjust the phases and amplitudes of signals transmitted or received through multiple antennas or antenna elements. The RF processor 11-10 may also perform MIMO and may receive data of multiple layers of data during the MIMO operation.

The baseband processor 11-20 performs conversion between a baseband signal and a bitstream based on the physical layer specifications of a system. For example, during data transmission, the baseband processor 11-20 generates complex symbols by encoding and modulating a transmission bitstream. In addition, during data reception, the baseband processor 11-20 reconstructs a received bitstream by demodulating and decoding a baseband signal provided from the RF processor 11-10. For example, according to an orthogonal frequency-division multiplexing (OFDM) scheme, during data transmission, the baseband processor 11-20 generates complex symbols by encoding and modulating a transmission bitstream, maps the complex symbols to subcarriers, and then configures OFDM symbols by performing inverse fast Fourier transformation (IFFT) operation and cyclic prefix (CP) insertion. Further, during data reception, the baseband processor 11-20 segments a baseband signal, provided from the RF processor 11-10, in units of OFDM symbols, reconstructs signals mapped to subcarriers by performing a fast Fourier transformation (FFT) operation, and then reconstructs a received bitstream by demodulating and decoding the signals.

The baseband processor 11-20 and the RF processor 11-10 transmit and receive signals as described above. Accordingly, each of the baseband processor 11-20 and the RF processor 11-10 may also be referred to as a transmitter, a receiver, a transceiver, or a communication unit. Furthermore, at least one of the baseband processor 11-20 and the RF processor 11-10 may include multiple communication modules to support multiple different radio-access technologies. In addition, at least one of the baseband processor 11-20 and the RF processor 11-10 may include multiple communication modules to process signals of different frequency bands. For example, the different radio-access technologies may include a wireless local area network (LAN) (e.g., IEEE 802.11), a cellular network (e.g., LTE), and the like. In addition, the different frequency bands may include a super-high frequency (SHF) (e.g., 2 NRHz and NRhz) band and a millimeter-wave (mmWave) (e.g., 60 GHz) band.

The memory 11-30 stores data such as basic programs, applications, configuration information, or the like for the operation of the terminal. In particular, the memory 11-30 may store information related to a second access node for performing wireless communication using a second radio-access technology. The memory 11-30 provides the stored data in response to a request from the controller 11-40.

The controller 11-40 controls the overall operation of the terminal. For example, the controller 11-40 transmits or receives signals through the baseband processor 11-20 and the RF processor 11-10. Further, the controller 11-40 records and reads data to or from the memory 11-30. To this end, the controller 11-40 may include at least one processor 11-42. For example, the controller 11-40 may include a communication processor (CP) for controlling communication and an application processor (AP) for controlling an upper layer such as an application.

Figure 12:
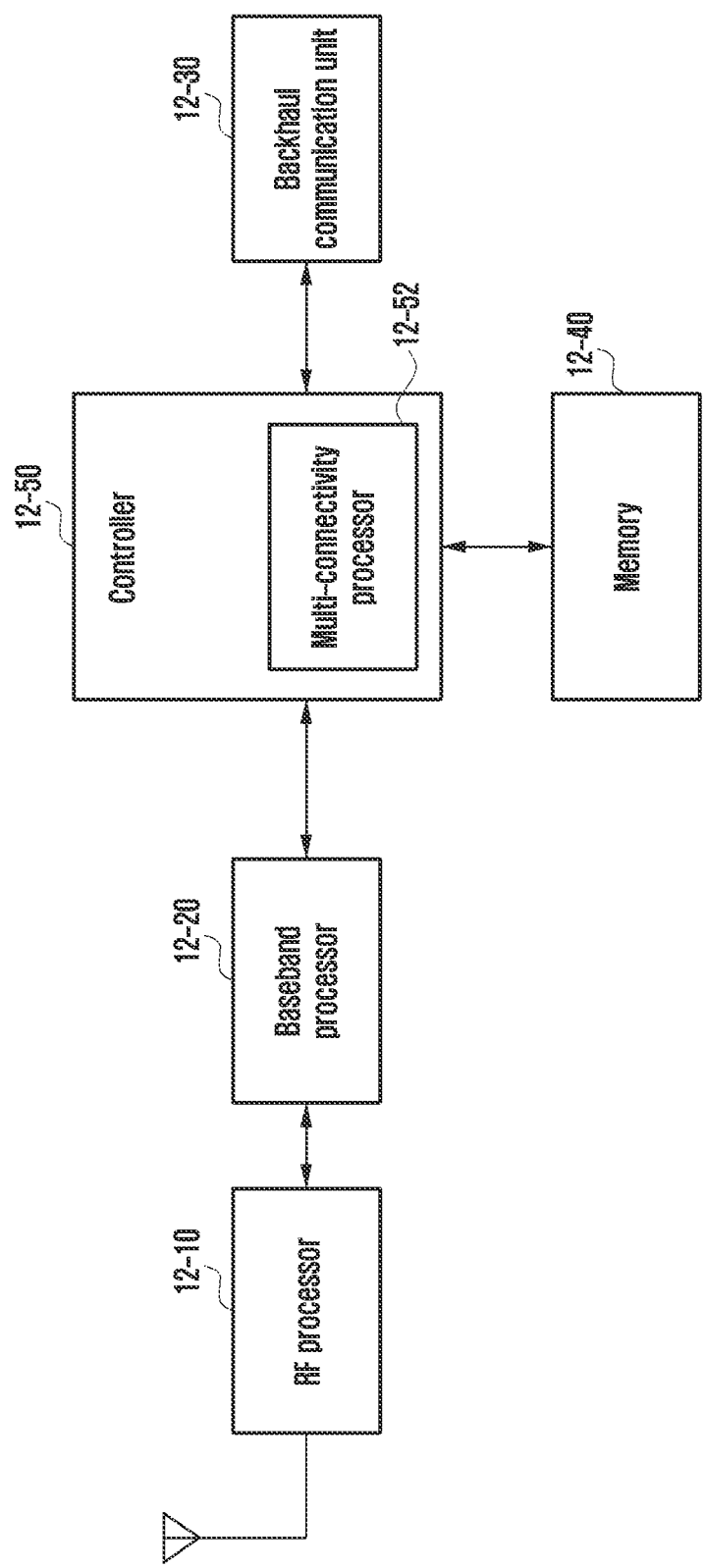
FIG. 12 is a block diagram illustrating the configuration of a base station according to an embodiment of the disclosure.

FIG. 12 is a block diagram illustrating the configuration of a base station according to an embodiment of the disclosure.

Referring to FIG. 12, the base station includes an RF processor 12-10, a baseband processor 12-20, a backhaul communication unit 12-30, a memory 12-40, and a controller 12-50.

The RF processor 12-10 performs a function of transmitting or receiving a signal through a radio channel, such as signal band conversion and amplification. That is, the RF processor 12-10 up-converts a baseband signal provided from the baseband processor 12-20 to an RF-band signal and transmits the converted RF-band signal through an antenna, and down-converts an RF-band signal received through an antenna to a baseband signal. For example, the RF processor 12-10 may include a transmission filter, a reception filter, an amplifier, a mixer, an oscillator, a DAC, an ADC, and the like. Although only a single antenna is illustrated in FIG. 12, the base station may include multiple antennas. In addition, the RF processor 12-10 may include multiple RF chains. Furthermore, the RF processor 12-10 may perform beamforming. For beamforming, the RF processor 12-10 may adjust phases and amplitudes of signals transmitted or received through multiple antennas or antenna elements. The RF processor 12-10 may perform downlink MIMO operation by transmitting data of one or more layers.

The baseband processor 12-20 perform conversion between a baseband signal and a bitstream based on the physical layer specifications of a first radio-access technology. For example, during data transmission, the baseband processor 12-20 generates complex symbols by encoding and modulating a transmission bitstream. In addition, during data reception, the baseband processor 12-20 reconstructs a received bitstream by demodulating and decoding a baseband signal provided from the RF processor 12-10. For example, according to an OFDM scheme, during data transmission, the baseband processor 12-20 generates complex symbols by encoding and modulating a transmission bitstream, maps the complex symbols to subcarriers, and then configures OFDM symbols by performing IFFT operation and CP insertion. Further, during data reception, the baseband processor 12-20 segments a baseband signal provided from the RF processor 12-10 into units of OFDM symbols, reconstructs signals mapped to subcarriers by performing FFT operation, and then reconstructs a received bitstream by demodulating and decoding the signals. The baseband processor 12-20 and the RF processor 12-10 transmit and receive signals as described above.

Accordingly, each of the baseband processor 12-20 and the RF processor 12-10 may also be referred to as a transmitter, a receiver, a transceiver, a communication unit, or a wireless communication unit.

The backhaul communication unit 12-30 provides an interface for communicating with other nodes in a network. That is, the backhaul communication unit 12-30 transforms a bitstream transmitted from a primary base station to another node, for example, a secondary base station, a core network, or the like, into a physical signal, or transforms a physical signal received from another node into a bitstream.

The memory 12-40 stores data such as basic programs, applications, configuration information, or the like for the operation of the terminal. In particular, the memory 12-40 may store information related to a bearer allocated to a connected terminal, a result of measurement reported from the connected terminal, and the like. In addition, the memory 12-40 may store information which serves as criteria for determining whether or not to provide multi-connectivity to the terminal. The memory 12-40 provides the stored data upon a request from the controller 12-50.

The controller 12-50 controls the overall operation of the primary base station. For example, the controller 12-50 transmits or receives a signal through the baseband processor 12-20 and the RF processor 12-10 or through the backhaul communication unit 12-30. In addition, the controller 12-50 records and reads data on or from the memory 12-40. To this end, the controller 12-50 may include at least one processor 12-52.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

Although specific embodiments have been described in the detailed description of the disclosure, various modifications and changes may be made thereto without departing from the scope of the disclosure. Therefore, the scope of the disclosure should not be defined as being limited to the embodiments, but should be defined by the appended claims and equivalents thereof.

It should be appreciated that various embodiments of the disclosure and the terms used therein are not intended to limit the technological features set forth herein to particular embodiments and include various changes, equivalents, and/or alternatives for a corresponding embodiment. With regard to the description of the drawings, similar reference numerals may be used to designate similar or relevant elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via another element (e.g., third element).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC).

Various embodiments as set forth herein may be implemented as software (e.g., the program) including instructions that are stored in a storage medium (e.g., internal memory or external memory) that is readable by a machine (e.g., computer). The machine is a device that can invoke the stored instructions from the storage medium and operate according to the invoked instructions, and may include auxiliary base station or terminals according to various embodiments. When the instructions are executed by a processor (e.g., the controller 11-40, 12-50 in the device drawings), the processor may perform at least one function according to the at least one instruction perform functions corresponding to the instructions, with or without using other components under the control of the processor. The instructions may include a code generated by a complier or a code executable by an interpreter.

The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

Methods according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

According to various embodiments described above, operations performed by the module, the program, or another element may be carried out sequentially, in parallel, repeatedly, or heuristically, or one or more of the operations may be executed in a different order or omitted, or one or more other operations may be added.

The methods of the various embodiments illustrated in FIGS. 1 to 12 may include a combination of methods from one or more drawings according to various implementations.

For example, FIGS. 1 to 12 illustrate operations related to a cross-link interference measurement and reporting procedure, and according to various implementations, the methods may include a combination of methods from one or more drawings.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:

receiving, from a base station, a measurement object configuration information for a cross link interference (CLI) measurement including a sounding reference signal (SRS) resource configuration information for the CLI measurement, wherein the SRS resource configuration information includes information on an SRS resource for the CLI measurement and an identifier (ID) of a bandwidth part (BWP);

measuring a reference signal received power (RSRP) of the SRS received on the SRS resource based on the SRS resource configuration information; and transmitting, to the base station, a measurement report including CLI measurement information on the RSRP of the SRS.

2. The method of claim 1, wherein a report configuration information for the CLI measurement is received from the base station, and wherein the measurement report is transmitted based on the report configuration information for the CLI measurement.

3. The method of claim 2, further comprising:

identifying a threshold value for triggering a transmission of the RSRP of the SRS based on the report configuration information for the CLI measurement, wherein the transmission of the measurement report for the CLI measurement including the information for the RSRP of the SRS is triggered in case that the RSRP of the SRS is higher than the identified threshold value.

4. The method of claim 1, wherein the information on the SRS resource for the CLI measurement includes at least one of information on a number of ports, information on frequency hopping, or information on a frequency domain resource, wherein the ID of the BWP is used to identify a reference point for the SRS resource for the CLI measurement, and wherein the SRS resource configuration information further includes information on a serving cell for which the BWP is configured.

5. The method of claim 2, wherein the report configuration information for the CLI measurement includes an event triggered report configuration information for the CLI measurement, wherein the event triggered report configuration information for the CLI measurement includes a threshold value for the RSRP of the SRS, wherein the measurement object configuration information further includes a resource configuration information for a reference signal strength indicator (RSSI) associated with the CLI measurement, wherein the resource configuration information for the RSSI associated with the CLI measurement includes information on a RSSI resource on which the RSSI to be measured, wherein the report configuration information includes an event triggered report configuration information for the CLI measurement, wherein the event triggered report configuration information includes a threshold value for the RSSI associated with the CLI measurement, wherein the RSSI associated with the CLI measurement is measured based on the RSSI resource, and wherein transmission of a measurement report including information on the RSSI associated with the CLI measurement is triggered based on an identification that the RSSI associated with the CLI measurement is higher than the threshold.

6. A method performed by a base station in a communication system, the method comprising:

transmitting, to a terminal, a measurement object configuration information for a cross link interference (CLI) measurement including a sounding reference signal (SRS) resource configuration information for the CLI measurement, wherein the SRS resource configuration information includes information on an SRS resource for the CLI measurement and an identifier (ID) of a bandwidth part (BWP); and receiving, from the terminal, a measurement report including a CLI measurement information on a reference signal received power (RSRP) of the SRS received on the SRS resource, wherein the RSRP of the SRS measured based on the SRS resource configuration information.

7. The method of claim 6, wherein the measurement object configuration information further includes a report configuration information for the CLI measurement, and wherein the measurement report is received based on the report configuration information for the CLI measurement.

8. The method of claim 7, wherein a threshold value for triggering a transmission of the RSRP of the SRS is identified based on the report configuration information for the CLI measurement, and wherein the transmission of the measurement report for the CLI measurement including the information for the RSRP of the SRS is triggered in case that the RSRP of the SRS is higher than the identified threshold value.

9. The method of claim 6, wherein the information on the SRS resource for the CLI measurement includes at least one of information on a number of ports, information on frequency hopping, or information on a frequency domain resource, wherein the ID of the BWP is used to identify a reference point for the SRS resource for the CLI measurement, and wherein the SRS resource configuration information further includes information on a serving cell for which the BWP is configured.

10. The method of claim 7, wherein the report configuration information for the CLI measurement includes an event triggered report configuration information for the CLI measurement, wherein the event triggered report configuration information for the CLI measurement includes a threshold value for the RSRP of the SRS, wherein the measurement object configuration information further includes a resource configuration information for a reference signal strength indicator (RSSI) associated with the CLI measurement, wherein the resource configuration information for the RSSI associated with the CLI measurement includes fifth information on a RSSI resource on which the RSSI to be measured, wherein the report configuration information includes an event triggered report configuration information for the CLI measurement, wherein the event triggered report configuration information includes a threshold value for the RSSI associated with the CLI measurement, wherein the RSSI associated with the CLI measurement is measured based on the RSSI resource, and wherein reception of a measurement report including information on the RSSI associated with the CLI measurement is based on an identification that the RSSI associated with the CLI measurement is higher than the threshold.

11. A terminal in a communication system, the terminal comprising:

a transceiver; and a controller coupled with the transceiver and configured to:

receive, from a base station, a measurement object configuration information for a cross link interference (CLI) measurement including a sounding reference signal (SRS) resource configuration information for the CLI measurement, wherein the SRS resource configuration information includes information on an SRS resource for the CLI measurement and an identifier (ID) of a bandwidth part (BWP), measure a reference signal received power (RSRP) of the SRS received on the SRS resource based on the SRS resource configuration information, and transmit, to the base station, a measurement report including CLI measurement information on the RSRP of the SRS.

12. The terminal of claim 11, wherein the measurement object configuration information further includes a report configuration information for the CLI measurement, and wherein the measurement report is transmitted based on the report configuration information for the CLI measurement.

13. The terminal of claim 12, wherein the controller is further configured to:

identify a threshold value for triggering a transmission of the RSRP of the SRS based on the report configuration information for the CLI measurement, and wherein the transmission of the measurement report for the CLI measurement including the information for the RSRP of the SRS is triggered in case that the RSRP of the SRS is higher than the identified threshold value.

14. The terminal of claim 11, wherein the information on the SRS resource for the CLI measurement includes at least one of information on a number of ports, information on frequency hopping, or information on a frequency domain resource, wherein the ID of the BWP is used to identify a reference point for the SRS resource for the CLI measurement, and wherein the SRS resource configuration information further includes information on a serving cell for which the BWP is configured.

15. The terminal of claim 12,
wherein the report configuration information for the CLI measurement includes an event triggered report configuration information for the CLI measurement,
wherein the event triggered report configuration information for the CLI measurement includes a threshold value for the RSRP of the SRS,
wherein the measurement object configuration information further includes a resource configuration information for a reference signal strength indicator (RSSI) associated with the CLI measurement,
wherein the resource configuration information for the RSSI associated with the CLI measurement includes fifth information on a RSSI resource on which the RSSI to be measured,
wherein the report configuration information includes an event triggered report configuration information for the CLI measurement,
wherein the event triggered report configuration information includes a threshold value for the RSSI associated with the CLI measurement,
wherein the RSSI associated with the CLI measurement is measured based on the RSSI resource, and
wherein transmission of a measurement report including information on the RSSI associated with the CLI measurement is triggered based on an identification that the RSSI associated with the CLI measurement is higher than the threshold.

16. A base station in a communication system, the base station comprising:
a transceiver; and
a controller coupled with the transceiver and configured to:
transmit, to a terminal, a measurement object configuration information for a cross link interference (CLI) measurement including a sounding reference signal (SRS) resource configuration information for the CLI measurement, wherein the SRS resource configuration information includes information on an SRS resource for the CLI measurement and an identifier (ID) of a bandwidth part (BWP), and
receive, from the terminal, a measurement report including a CLI measurement information on a reference signal received power (RSRP) of the SRS received on the SRS resource,
wherein the RSRP of the SRS measured based on the SRS resource configuration information.

17. The base station of claim 16,
wherein the measurement object configuration information further includes a report configuration information for the CLI measurement, and
wherein the measurement report is received based on the report configuration information for the CLI measurement.

18. The base station of claim 17,
wherein a threshold value for triggering a transmission of the RSRP of the SRS is identified based on the report configuration information for the CLI measurement, and
wherein the transmission of the measurement report for the CLI measurement including the information for the RSRP of the SRS is triggered in case that the RSRP of the SRS is higher than the identified threshold value.

19. The base station of claim 16,
wherein the information on the SRS resource for the CLI measurement includes at least one of information on a number of ports, information on frequency hopping, or information on a frequency domain resource,
wherein the ID of the BWP is used to identify a reference point for the SRS resource for the CLI measurement, and
wherein the SRS resource configuration information further includes information on a serving cell for which the BWP is configured.

20. The base station of claim 17,
wherein the report configuration information for the CLI measurement includes an event triggered report configuration information for the CLI measurement,
wherein the event triggered report configuration information for the CLI measurement includes a threshold value for the RSRP of the SRS,
wherein the measurement object configuration information further includes a resource configuration information for a reference signal strength indicator (RSSI) associated with the CLI measurement,
wherein the resource configuration information for the RSSI associated with the CLI measurement includes fifth information on a RSSI resource on which the RSSI to be measured,
wherein the report configuration information includes an event triggered report configuration information for the CLI measurement,
wherein the event triggered report configuration information includes a threshold value for the RSSI associated with the CLI measurement,
wherein the RSSI associated with the CLI measurement is measured based on the RSSI resource, and
wherein reception of a measurement report including information on the RSSI associated with the CLI measurement is based on an identification that the RSSI associated with the CLI measurement is higher than the threshold.

* * * * *